United States Patent
Park et al.

(10) Patent No.: US 11,178,589 B2
(45) Date of Patent: Nov. 16, 2021

(54) METHOD AND USER EQUIPMENT FOR PERFORMING ATTACH REQUEST PROCEDURE

(71) Applicant: LG ELECTRONICS INC., Seoul (KR)

(72) Inventors: Sangmin Park, Seoul (KR); Laeyoung Kim, Seoul (KR); Taehun Kim, Seoul (KR); Jaehyun Kim, Seoul (KR); Jinsook Ryu, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/769,166

(22) PCT Filed: Dec. 31, 2018

(86) PCT No.: PCT/KR2018/016990
§ 371 (c)(1),
(2) Date: Jun. 2, 2020

(87) PCT Pub. No.: WO2019/135581
PCT Pub. Date: Jul. 11, 2019

(65) Prior Publication Data
US 2020/0389830 A1 Dec. 10, 2020

Related U.S. Application Data

(60) Provisional application No. 62/613,038, filed on Jan. 2, 2018.

(30) Foreign Application Priority Data

Jun. 26, 2018 (KR) .................. 10-2018-0073231
Aug. 13, 2018 (KR) .................. 10-2018-0094263

(51) Int. Cl.
*H04W 4/00* (2018.01)
*H04W 36/22* (2009.01)
(Continued)

(52) U.S. Cl.
CPC ............. *H04W 36/22* (2013.01); *H04W 8/08* (2013.01); *H04W 28/0289* (2013.01);
(Continued)

(58) Field of Classification Search
USPC ............................... 370/328, 329, 330, 331
See application file for complete search history.

(56) References Cited

U.S. PATENT DOCUMENTS 10,993,139 B2 * 4/2021 Ahmad ............. H04W 28/0268
2014/0355417 A1 * 12/2014 Kim .................... H04W 36/165
370/221

(Continued)

FOREIGN PATENT DOCUMENTS

KR 1020160052569 A 5/2016

OTHER PUBLICATIONS

"TS 23.501: Editorial corrections and alignment", S2-178184, SA WG2 Meeting #123, Oct. 23-27, 2017, Ljubljana, Slovenia.
(Continued)

*Primary Examiner* — David Q Nguyen
(74) *Attorney, Agent, or Firm* — Dentons US LLP

(57) ABSTRACT

One disclosure of the present specification provides a method in which a user equipment (UE) performs an attach request procedure. The method comprises a step of transmitting an attach request message to a second system when an intersystem change from a first system to the second system is required in a state where a back-off timer associated with a data network name (DNN) based congestion control is running. The attach request message may include information on a packet data unit (PDU) session used by the
(Continued)

UE in the first system. The information on the PDU session may be used so as not for the attach request message to be rejected by a second network, even if the back-off timer associated with the DNN-based congestion control is running.

14 Claims, 23 Drawing Sheets

(51) Int. Cl.
*H04W 8/08* (2009.01)
*H04W 28/02* (2009.01)
*H04W 60/04* (2009.01)
*H04W 88/06* (2009.01)
*H04W 92/02* (2009.01)

(52) U.S. Cl.
CPC ........... *H04W 60/04* (2013.01); *H04W 88/06* (2013.01); *H04W 92/02* (2013.01)

(56) References Cited

U.S. PATENT DOCUMENTS

| | | | |
|---|---|---|---|
| 2018/0049059 A1* | 2/2018 | Kumar | H04W 8/02 |
| 2019/0159157 A1* | 5/2019 | Gupta | H04W 60/005 |
| 2019/0289506 A1* | 9/2019 | Park | H04W 76/27 |
| 2019/0342821 A1* | 11/2019 | Kim | H04W 76/10 |

OTHER PUBLICATIONS

"Congestion control", S2-178863, SA WG2 Meeting #124, Nov. 27-Dec. 1, 2017, Reno, Nevada (USA).

"Congestion control", S2-179300, SA WG2 Meeting #124, Nov. 27-Dec. 2017, Reno, Nevada (USA).

"LS on session management congestion control", S2-180026, SA WG2 Meeting #S2-125, Jan. 22-26, 2018, Gothenburg, Sweden.

* cited by examiner

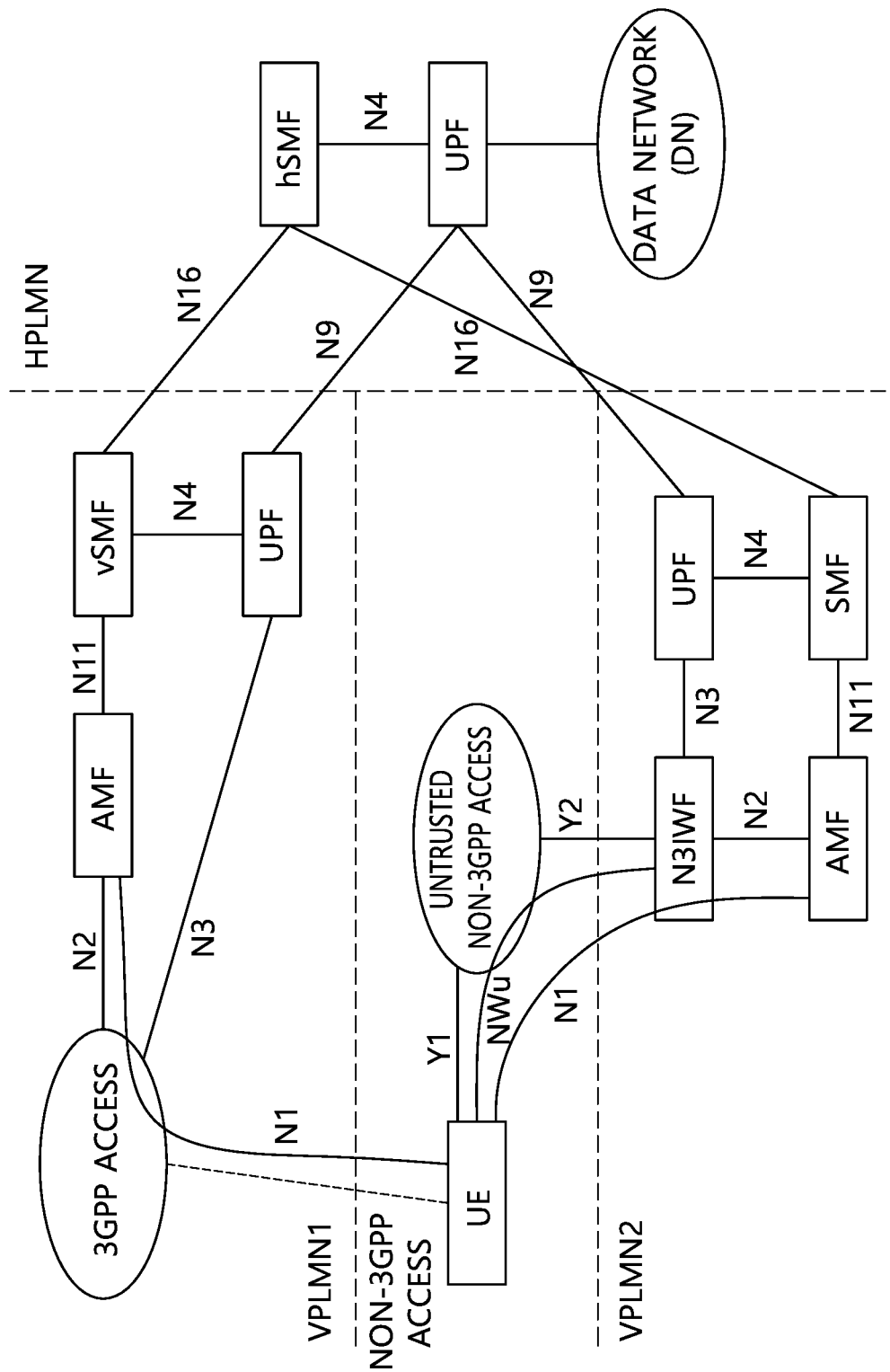

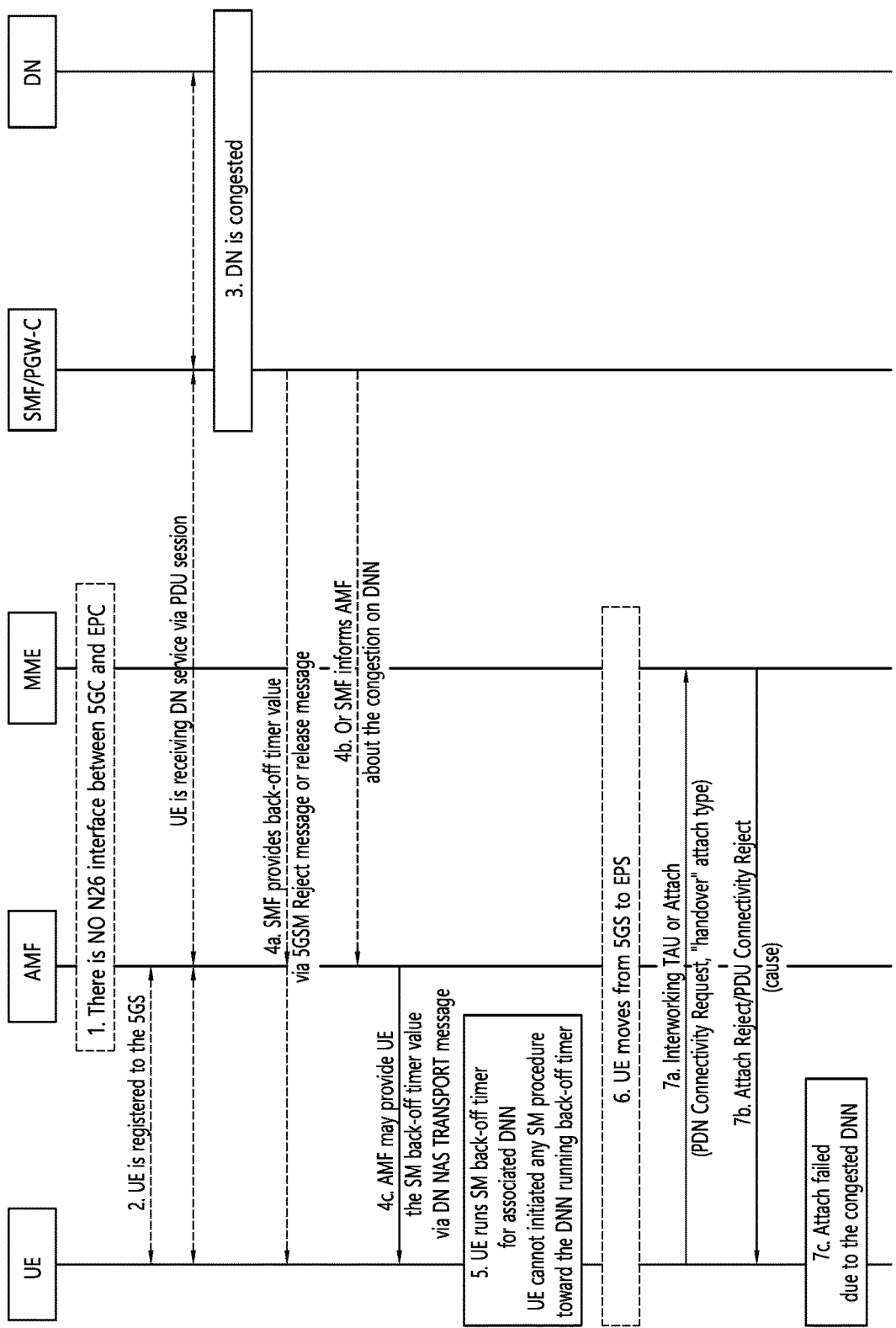

METHOD AND USER EQUIPMENT FOR PERFORMING ATTACH REQUEST PROCEDURE

CROSS-REFERENCE TO RELATED APPLICATIONS

This application is the National Stage filing under 35 U.S.C. 371 of International Application No. PCT/KR2018/016990, filed on Dec. 31, 2018, which claims the benefit of U.S. Provisional Application No. 62/613,038 filed on Jan. 2, 2018, Korean Patent Applications No. 10-2018-0073231 filed on Jun. 26, 2018 and No. 10-2018-0094263 filed on Aug. 13, 2018 the contents of which are all hereby incorporated by reference herein in their entirety.

BACKGROUND OF THE DISCLOSURE

Field of the Disclosure

The present disclosure relates to a next generation mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 3 may perform all or a part of the MME (Mobility Management Entity) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the figure is a type of a gateway over which user data is transmitted and received. The UPF node may perform all or part of the user plane functions of the S-GW and the P-GW of the fourth generation mobile communication.

The PCF (Policy Control Function) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, like an HSS (Home Subscriber Server) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

FIG. 3a is an exemplary diagram illustrating an architecture for supporting a multiple PDU session through two data networks. FIG. 3b is an exemplary diagram illustrating an architecture for supporting a concurrent access through two data networks.

FIG. 3a illustrates an architecture that allows an UE to simultaneously access two data network using a multiple PDU session. Two SMFs may be selected for two different PDU sessions.

FIG. 3b illustrates an architecture that allows the UE to simultaneously access two data networks using one PDU session.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

<Roaming in Next Generation Mobile Communication Network>

Meanwhile, there are two schemes for handling a signaling request from the UE in a situation where the UE roams in a visited network, for example, Visited Public Land Mobile Network (VPLMN). A local break out (LBO) being a first scheme handles a signaling request from the UE by a visited network. According to a Home Routing (HR) being a second scheme, the visited network transfers a signaling request from the UE to a home network of the UE.

FIG. 4a is an exemplary diagram illustrating an architecture to which the LBO scheme is applied during roaming. FIG. 4b is an exemplary diagram illustrating an architecture to which the HR scheme is applied during roaming.

As shown in FIG. 4a, in an architecture to which the LBO scheme is applied, user data are transferred to a data network in a VPLMN. To this end, a PCF in the VPLMN performs interaction with an AF in order to generate a PCC rule for a service in the VPLMN. A PCF node in the VPLMN creates a PCC rule based on a policy set inside according to a roaming convention with a Home Public Land Mobile Network (HPLMN) businessman.

As shown in FIG. 4b, in the architecture to which the HR scheme is applied, data of the UE is transferred to a data network in the HPLMN.

<Data Bypass to Non-3GPP Network>

In the next generation mobile communication, the data of the UE may bypass to a non-3GPP network, for example, a Wireless Local Area Network (WLAN) or Wi-Fi.

FIG. 5a to FIG. 5f illustrate architectures for bypassing data to the non-3GPP network.

The Wireless Local Area Network (WLAN) or Wi-Fi is regarded as the untrusted non-3GPP network. In order to access the non-3GPP network to a core network, a Non-3GPP InterWorking Function (N3IWF) may be added.

<Interworking with legacy 4G mobile communication system>

Even if the UE is out of coverage of the next-generation Radio Access Network (RAN), the UE should be able to receive a service even through a 4G mobile communication system. This is referred to as interworking. Hereinafter, the interworking will be described in detail.

FIG. 6A shows an architecture for interworking when the UE does not roam and FIG. 6B shows an architecture for interworking when the UE roams.

Referring to FIG. 6A, when the UE does not roam, the E-UTRAN and the EP for the legacy 4G LTE and the 5G mobile communication network may interwork with each other. In FIG. 6A, a Packet data network Gateway (PGW) for the legacy EPC is divided into PGW-U which is responsible only for a user plane and PGW-C which is responsible for a control plane. In addition, the PGW-U is merged to a UPF node of the 5G core network and the PGW-C is merged to an SMF node of the 5G core network. In addition, a Policy and Charging Rules Function (PCRF) for the legacy EPC may be merged to PCF of the 5G core network. Furthermore, HSS for the legacy EPC may be merged to UDM of the 5G core network. The UE may access the core network through E-UTRAN, but the UE may access the core network through a 5G radio access network (RAN) and AMF.

Referring to FIGS. 6A and 6B by comparing FIGS. 6A and 6B with each other, when the UE roams to a Visited Public Land Mobile Network (VPLMN), data of the UE is transferred via Home PLMN (HPLMN).

Meanwhile, an N26 interface shown in FIGS. 6A and 6B is an interface connected between the MME and the AMF to facilitate interworking between the EPC and the NG core. The N26 interface may be selectively supported depending on an operator. In other words, for interworking with the EPC, a network operator may provide the N26 interface or not provide the N26 interface.

SUMMARY OF THE DISCLOSURE

The prevent disclosure has been made in an effort to solve the above-described problems.

In an aspect, provided is a method for performing an attach request procedure. The method may be performed by a user equipment (UE) and comprise: transmitting an attach request message to a second system when an intersystem change from a first system to the second system is required in a state where a back-off timer associated with a data network name (DNN) based congestion control is running. The attach request message may include information on a packet data unit (PDU) session used by the UE in the first system. The information on the PDU session may be used so as not for the attach request message to be rejected by the second network, even if the back-off timer associated with the DNN-based congestion control is running.

The method may further include overriding the back-off timer which is running when the intersystem change from the first system to the second system is required.

The information on the PDU session may include identification information for one or more PDU sessions used in the first system.

The information on the PDU session may be included in an information element field in the attach request message.

The information on the PDU session may be included in a protocol configuration option (PCO) in a session management (SM) container in the attach request message.

The first network may be a 5th generation system (5GS) and the second network may be an evolved packet system (EPS).

In another aspect, provided is a method for performing an attach request procedure. The method may be performed by a mobility management entity (MME) and comprise: receiving an attach request message from user equipment (UE) which requires an intersystem change from a first system to a second system in a state where a back-off timer associated with a data network name (DNN) based congestion control is running; overriding the back-off timer which is running when the attach request message includes information on a packet data unit (PDU) session which the UE has used in the first system; and transmitting, to the UE, an accept message for the attach request message.

The method may further include performing a procedure for packet data network (PDN) connection creation for the corresponding PDU session based on the information on the PDU session.

The information on the PDU session may include identification information for one or more PDU sessions used in the first system.

The information on the PDU session may be included in an information element field in the attach request message.

The information on the PDU session may be included in a protocol configuration option (PCO) in a session management (SM) container in the attach request message.

The first network may be a 5th generation system (5GS) and the second network may be an evolved packet system (EPS).

In yet another aspect, provided is a user equipment (UE) for performing an attach request procedure. The UE may include: a transceiver; and a processor including the transceiver. The processor may perform a process of transmitting an attach request message to a second system when an intersystem change from a first system to the second system is required in a state where a back-off timer associated with a data network name (DNN) based congestion control is running. The attach request message may include information on a packet data unit (PDU) session used by the UE in the first system. The information on the PDU session may be used so as not for the attach request message to be rejected by the second network, even if the back-off timer associated with the DNN-based congestion control is running.

In still yet another aspect, provided is a mobility management entity (MME) for performing an attach request procedure. The MME may include: a transceiver; and a processor controlling the transceiver. The processor may perform a process of receiving an attach request message from user equipment (UE) which requires an intersystem change from a first system to a second system in a state where a back-off timer associated with a data network name (DNN) based congestion control is running; a process of overriding the back-off timer which is running when the attach request message includes information on a packet data unit (PDU) session which the UE uses in the first system; and a process of transmitting, to the UE, an accept message for the attach request message.

According to the disclosure of the present disclosure, the problem of the conventional technology described above may be solved.

BRIEF DESCRIPTION OF THE DRAWINGS

FIG. 5a to FIG. 5f illustrate architectures for bypassing data to the non-3GPP network.

FIGS. 9A and 9B show a problem which may occur in a procedure of moving from 5GS to EPS when there is no N26 interface.

DESCRIPTION OF EXEMPLARY EMBODIMENTS

Figure 1:
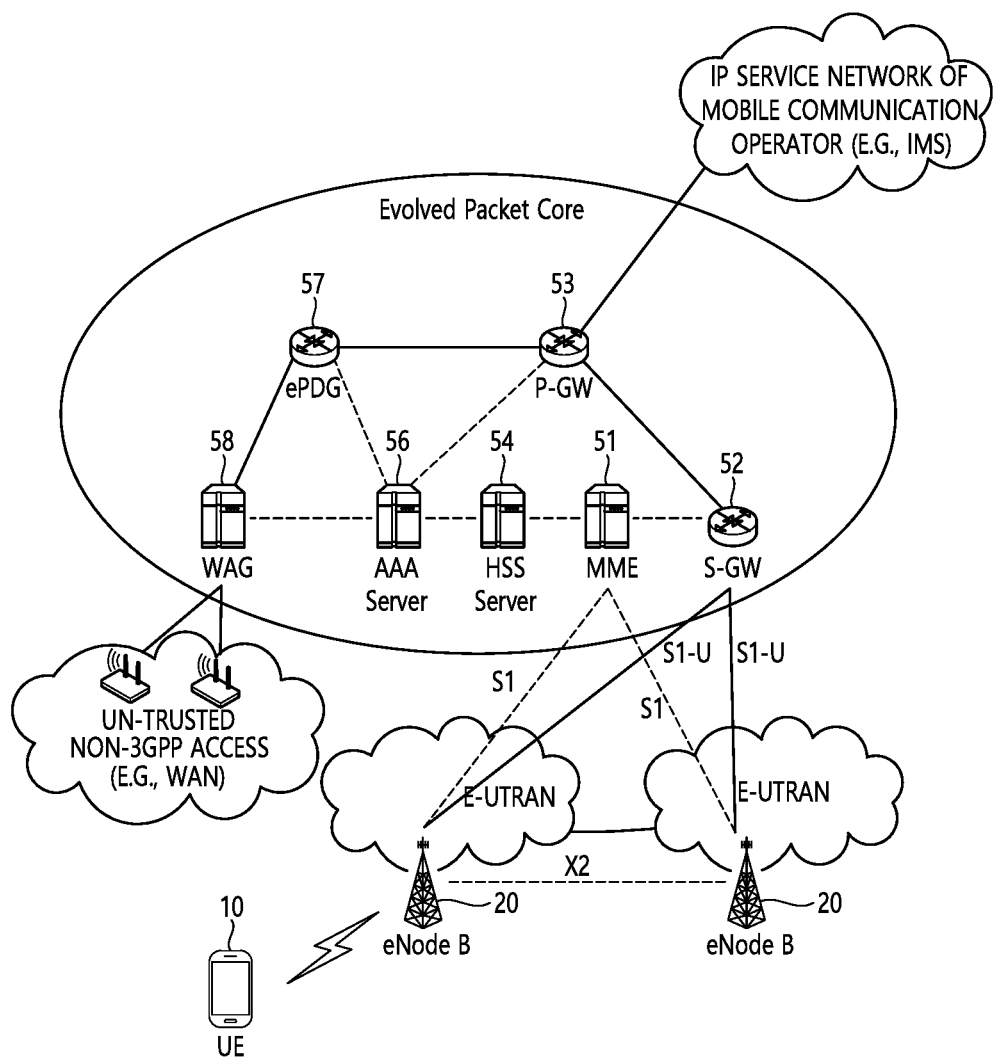
FIG. 1 shows the configuration of an evolved mobile communication network.
Figure 2:
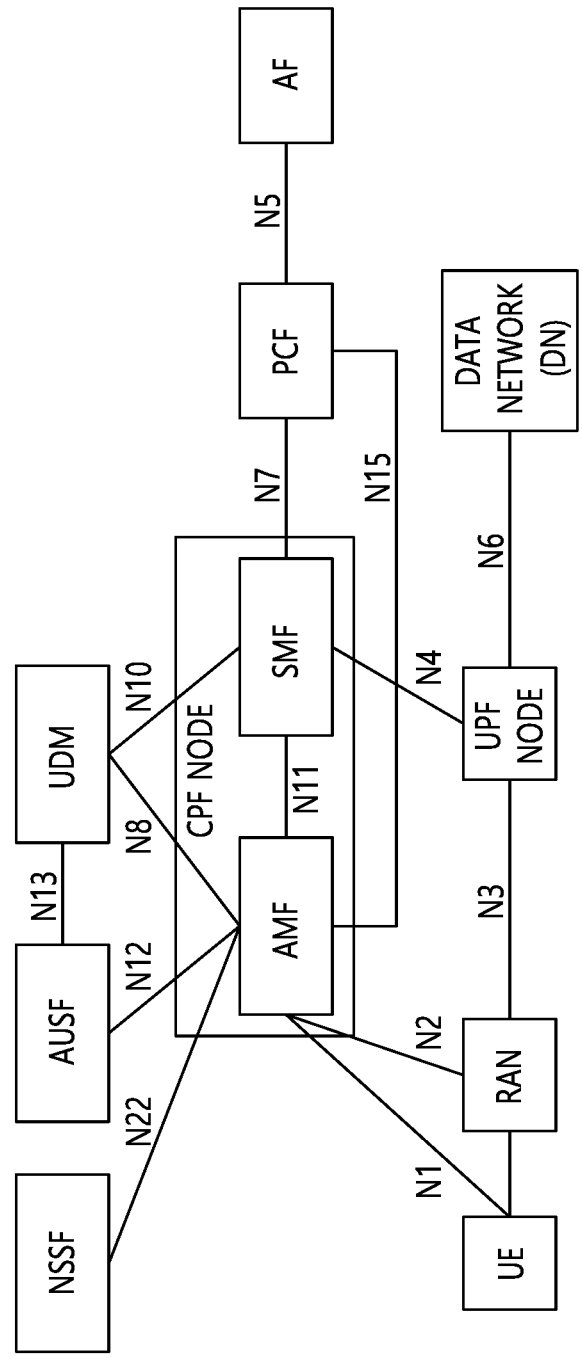
FIG. 2 is an exemplary diagram illustrating a predicted structure of a next generation mobile communication in terms of a node.
Figure 3A:
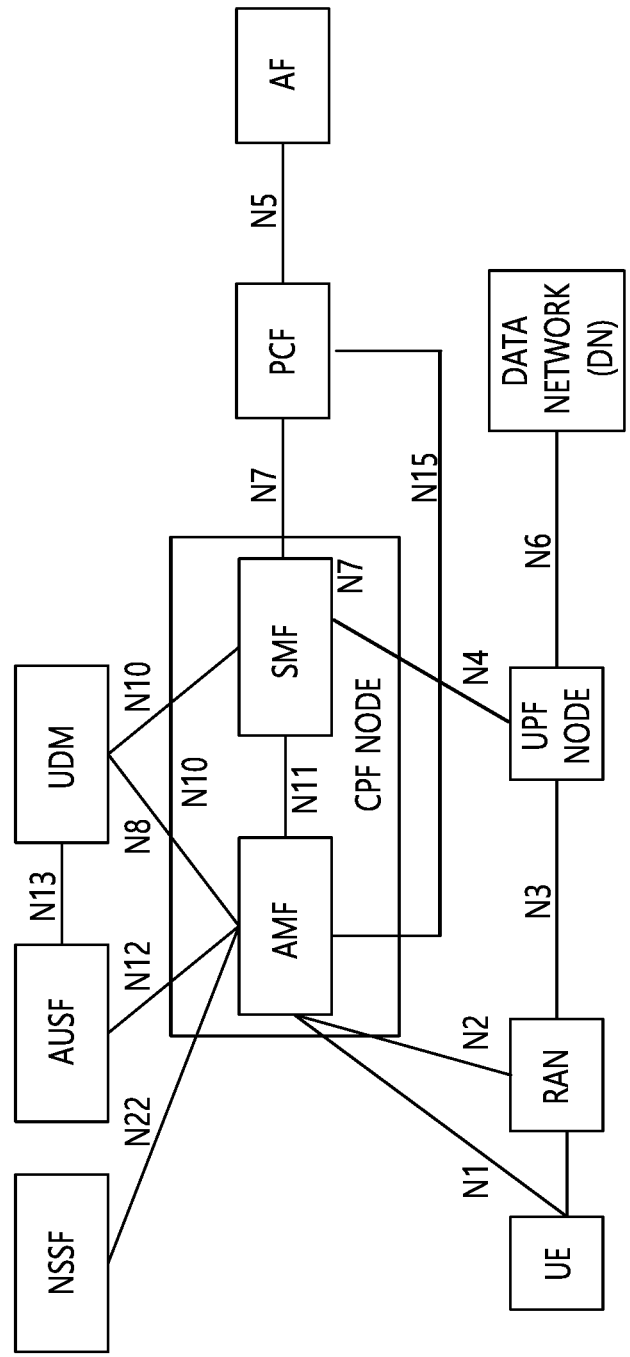
FIG. 3a is an exemplary diagram illustrating an architecture for supporting a multiple PDU session through two data networks.
Figure 3B:
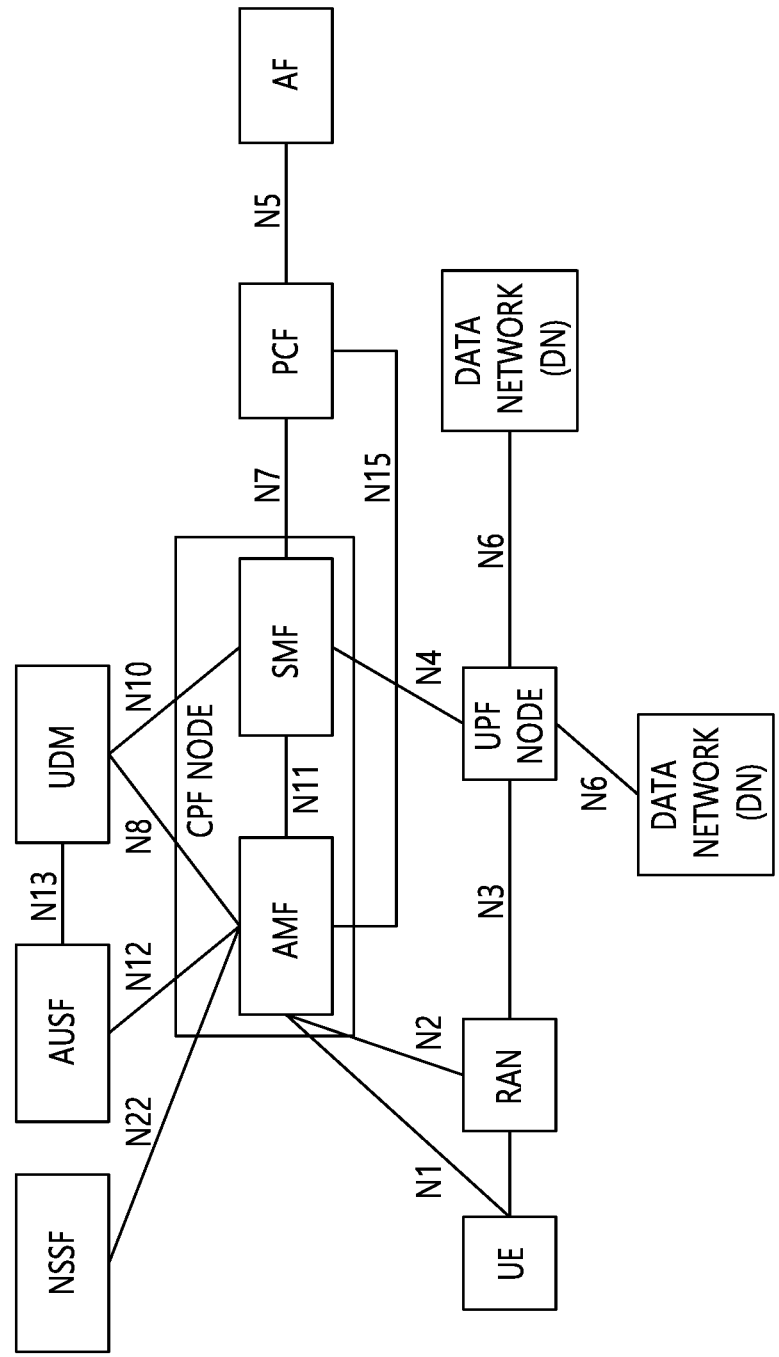
FIG. 3b is an exemplary diagram illustrating an architecture for supporting a concurrent access through two data networks.
Figure 4A:
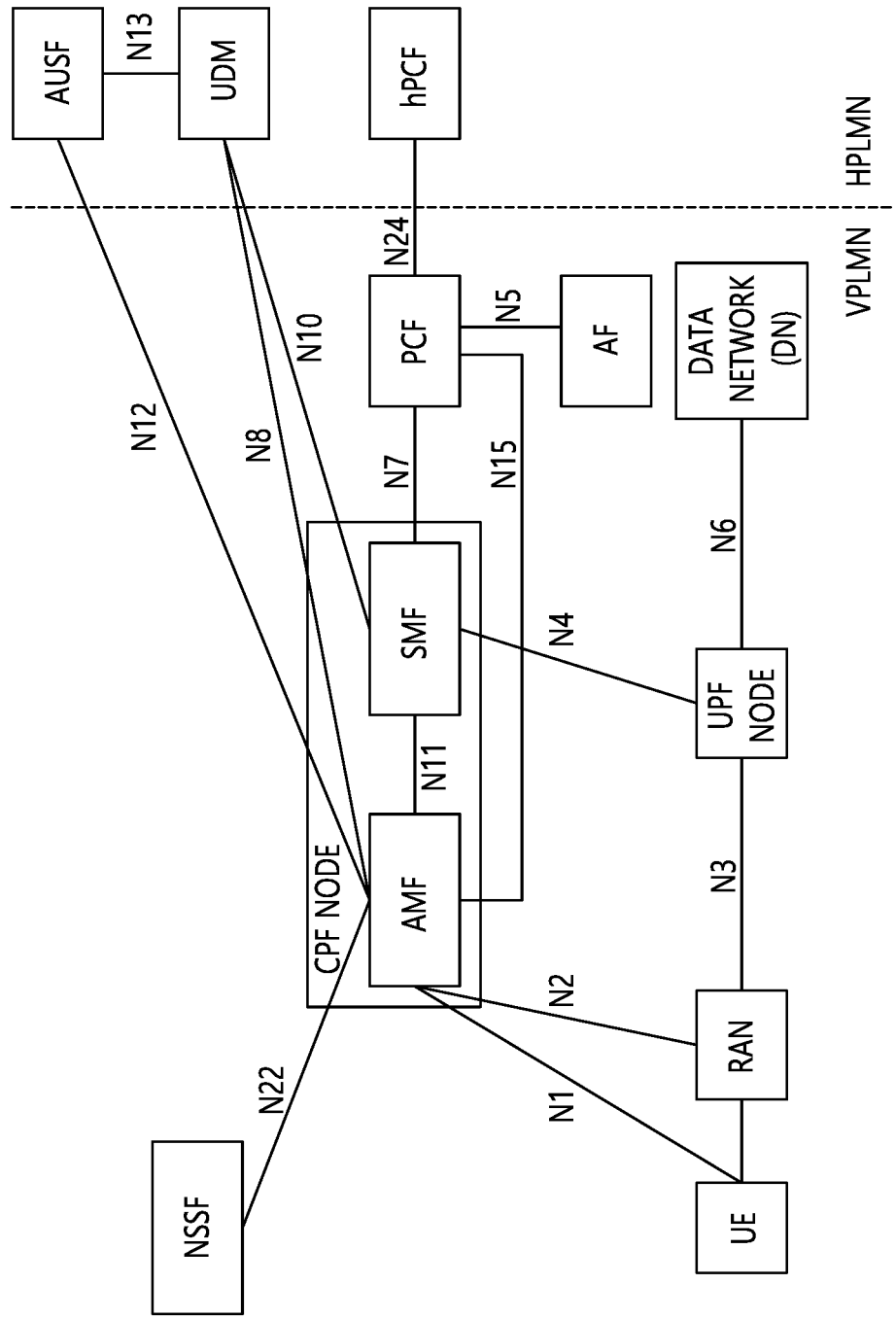
FIG. 4a is an exemplary diagram illustrating an architecture to which the LBO scheme is applied during roaming.
Figure 4B:
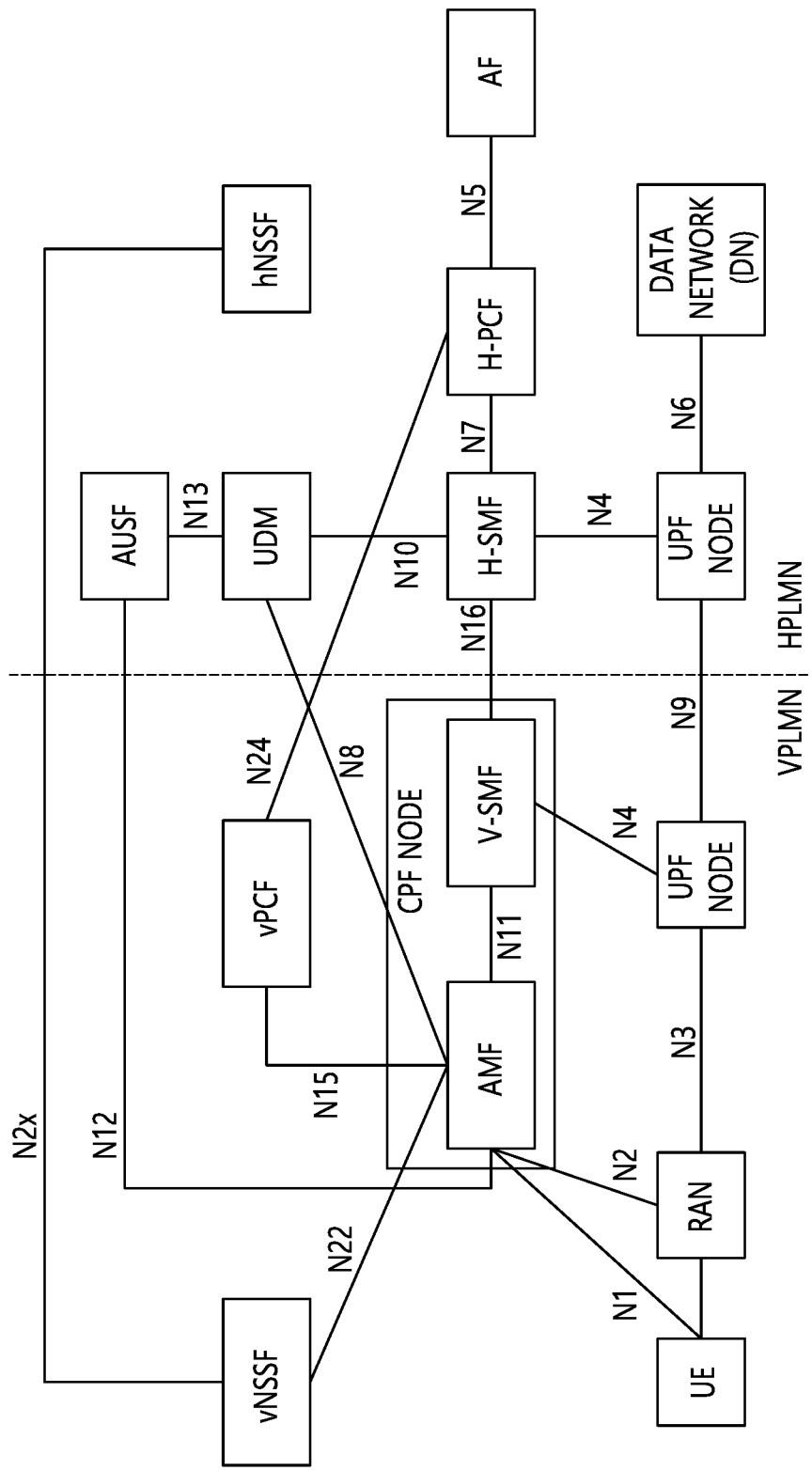
FIG. 4b is an exemplary diagram illustrating an architecture to which the HR scheme is applied during roaming.
Figure 5A:
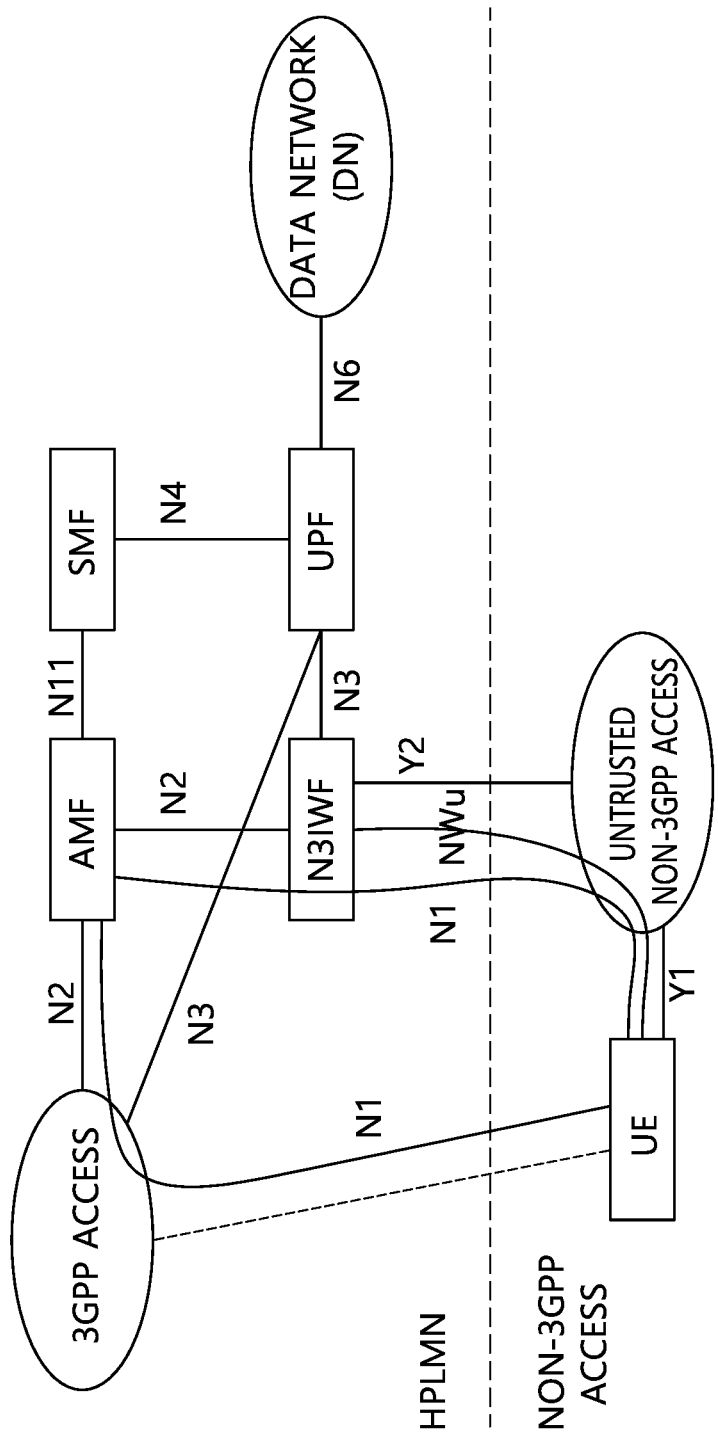
Figure 5B:
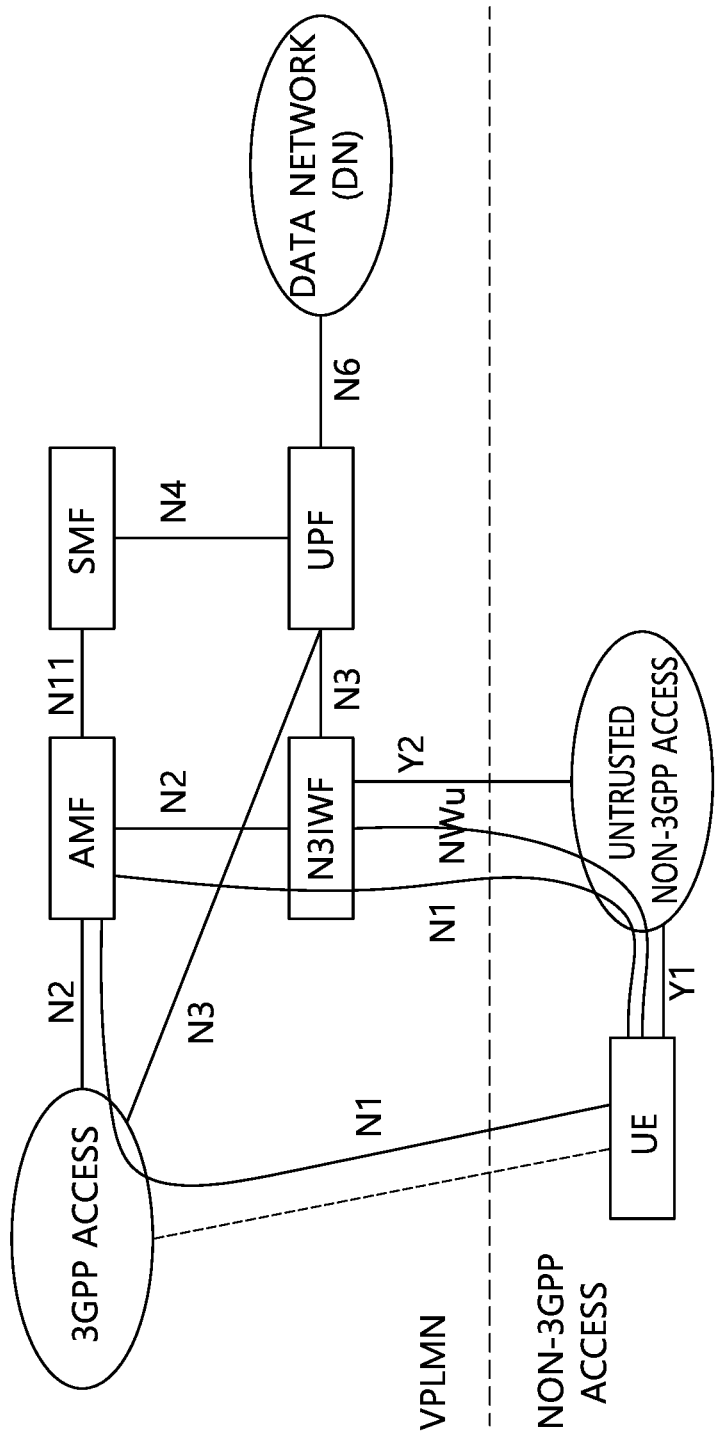
Figure 5C:
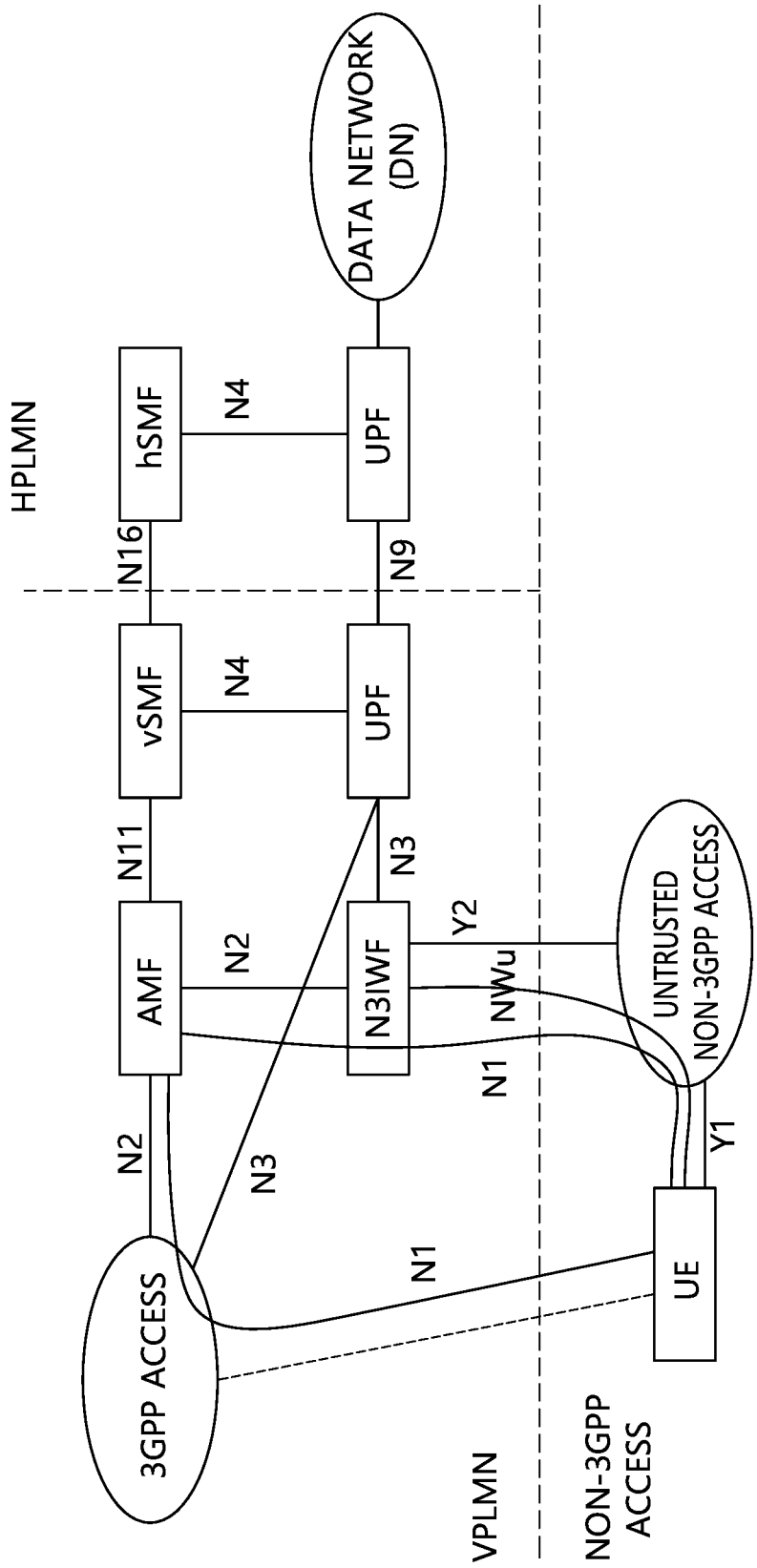
Figure 5D:
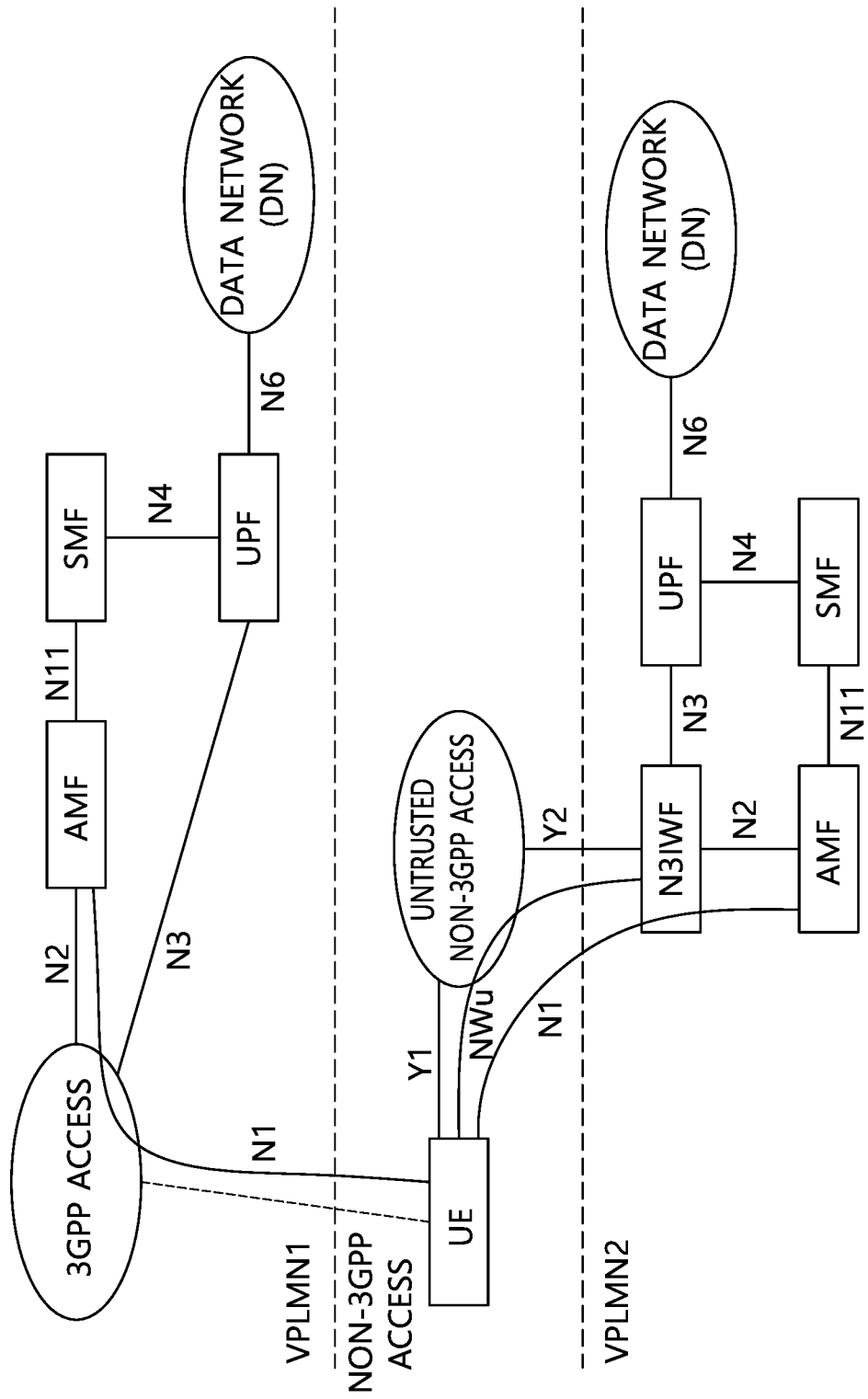
Figure 5F:
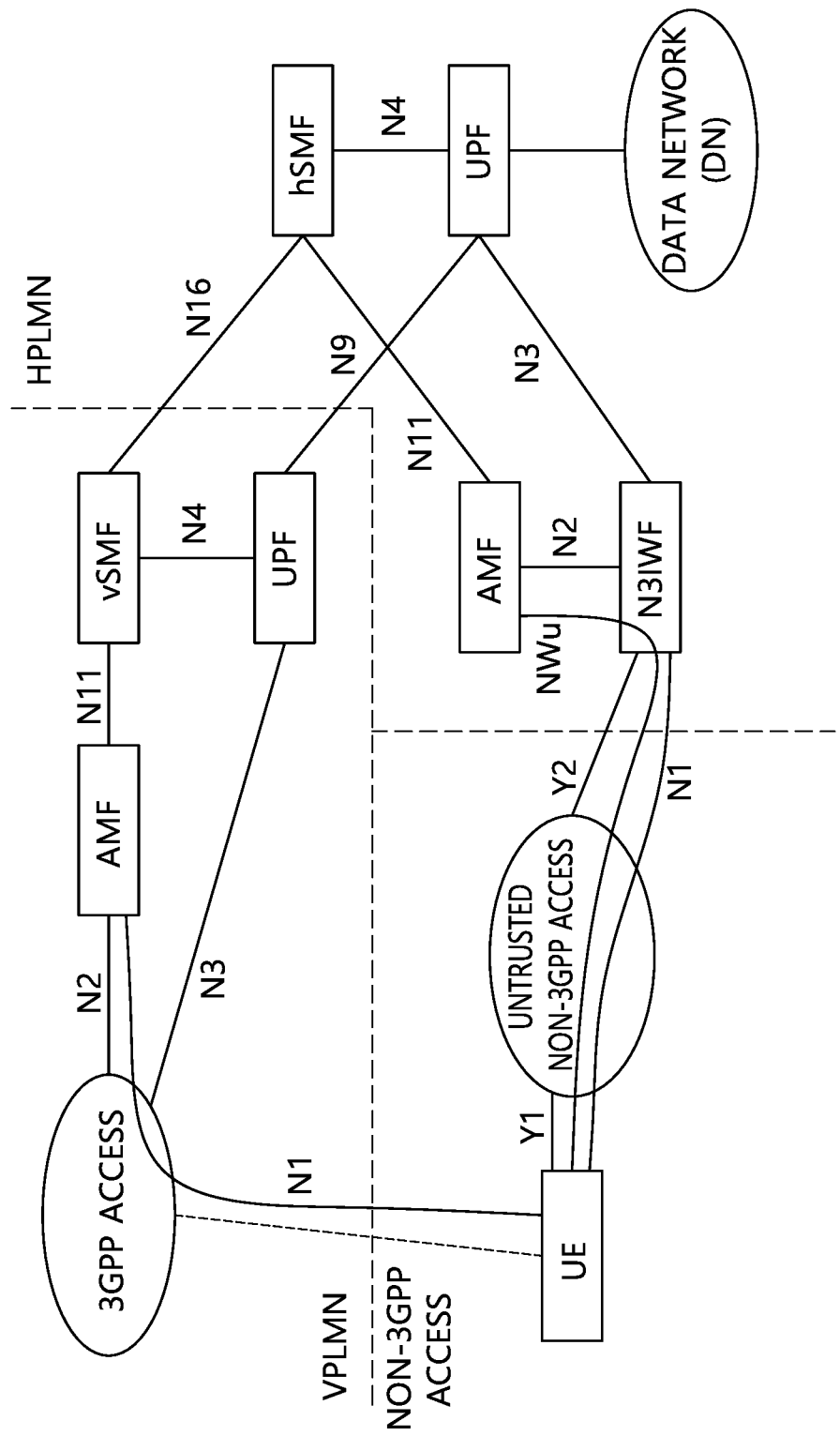
Figure 6A:
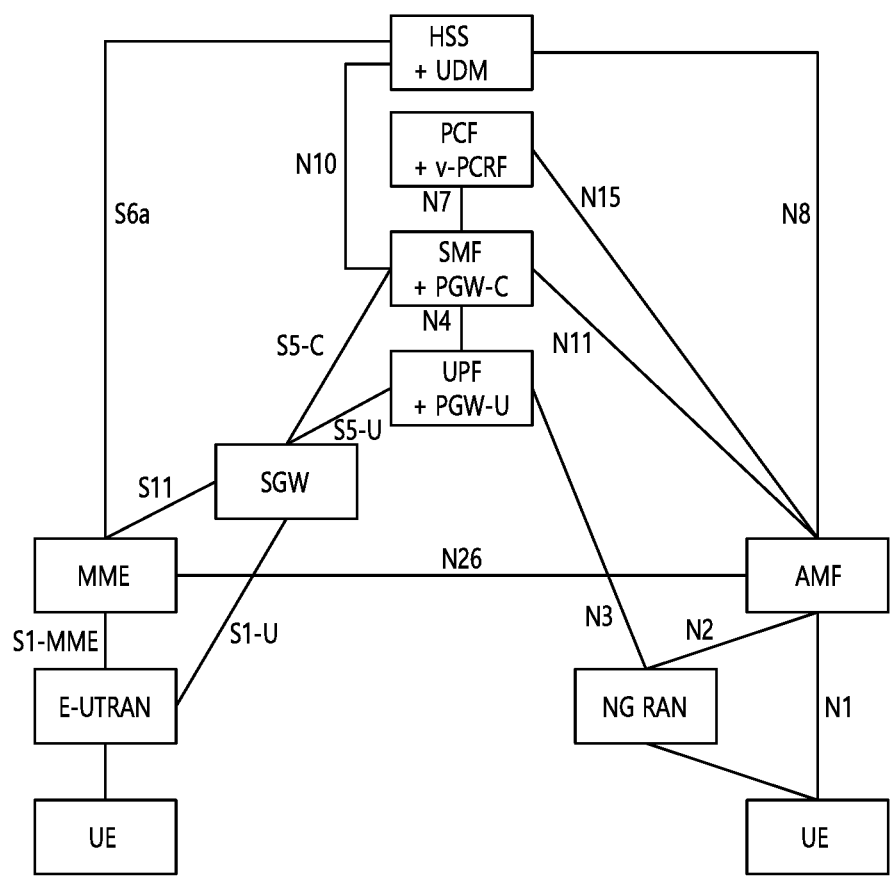
FIG. 6A shows an architecture for interworking when the UE does not roam and FIG. 6B shows an architecture for interworking when the UE roams.
Figure 6B:
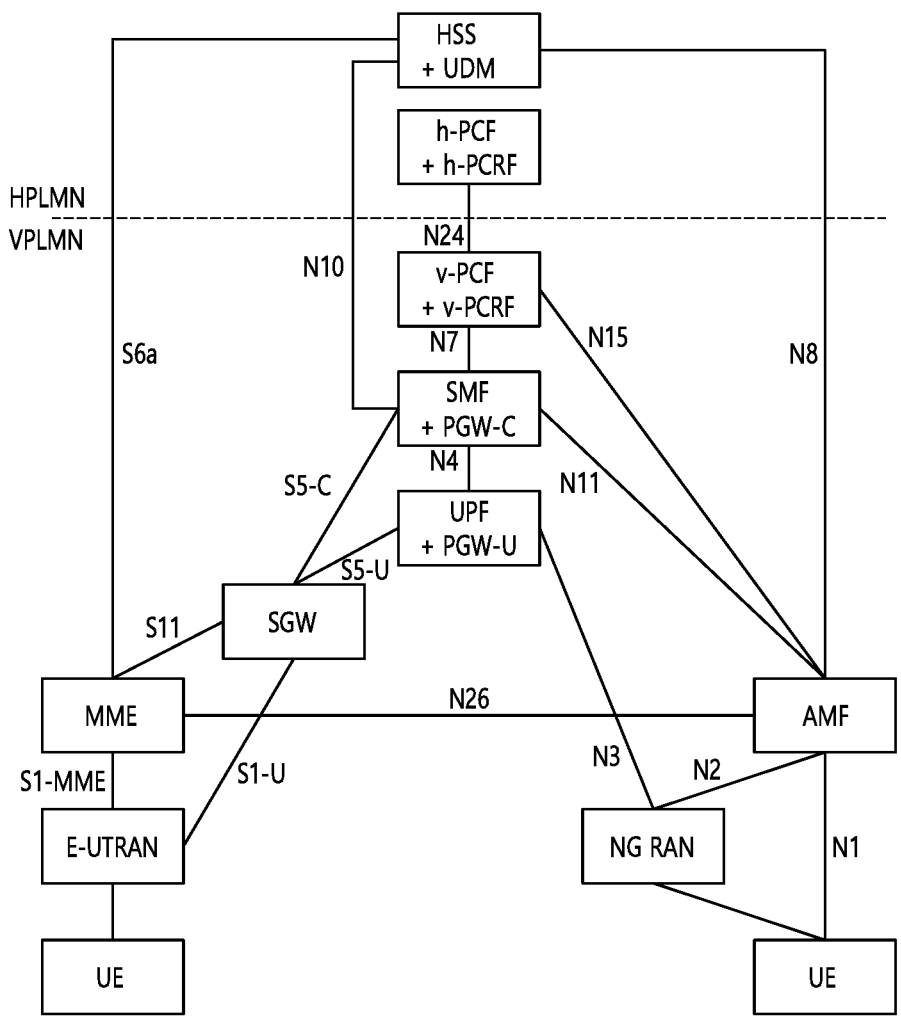

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Description of Terms

Hereinafter, prior to describing the present disclosure with reference to the appended drawings, in order to facilitate understanding of the present disclosure, various terms used in this disclosure will be briefly described.

UE/MS: This refers to a User Equipment/Mobile Station, UE.

EPS: This is an abbreviation for an Evolved Packet System, which to a core network supporting a Long Term Evolution (LTE) network. This network is an evolved form of the UMTS.

Public Data Network (PDN): This is an independent network in which a server providing a service is located.

Packet Data Network Gateway (PDN-GW): This is a network node of an EPS network performing functions of UE IP address allocation, packet screening and filtering, and charging data collection.

Serving Gateway (Serving GW): This is a network node of an EPS network performing functions of mobility anchor, packet routing, Idle mode packet buffering, and triggering MME to page a UE.

eNodeB (eNB): This is a base station of an Evolved Packet System (EPS), which is installed in the outdoors, and the size of its cell coverage corresponds to a macro cell.

MME: This is an abbreviation for a Mobility Management Entity, which performs a role of controlling each entity within the EPS in order to provide a session and mobility for the UE.

Session: A session refers to a path for performing data transmission, and its unit may be a PDN, a Bearer, an IP flow unit, and so on. As defined in the 3rd Generation Partnership Project (3GPP), the difference between each unit may be differentiated as an entire (or whole) target network unit (APN or PDN unit), units being differentiated by QoS within the entire (or whole) target network unit (Bearer units), and destination IP address units.

APN: This is an abbreviation for an Access Point Name, which is the name of an access point being managed by the network, and this name is provided to the UE. More specifically, this is a character string indicating or identifying a PDN. A corresponding P-GW needs to be passed through in order to access a requested service or network (PDN). And, the APN is a name (character string) that is defined in advance in order to find (or locate) the P-GW. For example, the APN may be defined as internet.mnc012.mcc345.gprs.

PDN connection: This indicates a connection from the UE to the PDN, i.e., a relation (connection) between a UE, which is expressed as an IP address, and a PDN, which is expressed as an APN. This denotes a connection (UE (100)-PDN GW) between entities within the core network so that a session can be configured.

UE Context: This refers to situation information of the UE, i.e., situation information configured of UE id, mobility (current location, and so on), and session attribute (QoS, priority level, and so on), being used for managing the UE in a network.

Non-Access-Stratum (NAS): This denotes an upper stratum of a control plane between UE and MME. This supports mobility management, session management, IP address maintenance, and so on, between the UE and the network.

PLMN: This is an abbreviation for a Public Land Mobile Network, which denotes a network identification number of an operator. In a roaming situation of a UE, the PLMN may be differentiated as a Home PLMN (HPLMN) and a Visited PLMN (VPLMN).

DNN: This is an abbreviation for a Data Network Name, which is the name of an access point being similarly managed by the network as the APN. And, this name is provided to the UE. In a 5G system, the DNN is used as an equivalent of the APN.

Contents to be described below in the present disclosure may be applied to a next-generation (so called 5 generation or 5G) mobile communication network.

<When there is no N26 interface, interworking procedure>

1. Moving from 5G system (5GS) to Evolved Packet System (EPS)

The following procedure indicates a procedure in which the UE moves from the EPS to the 5GS in a single registration mode or a dual registration mode.

Figure 7:
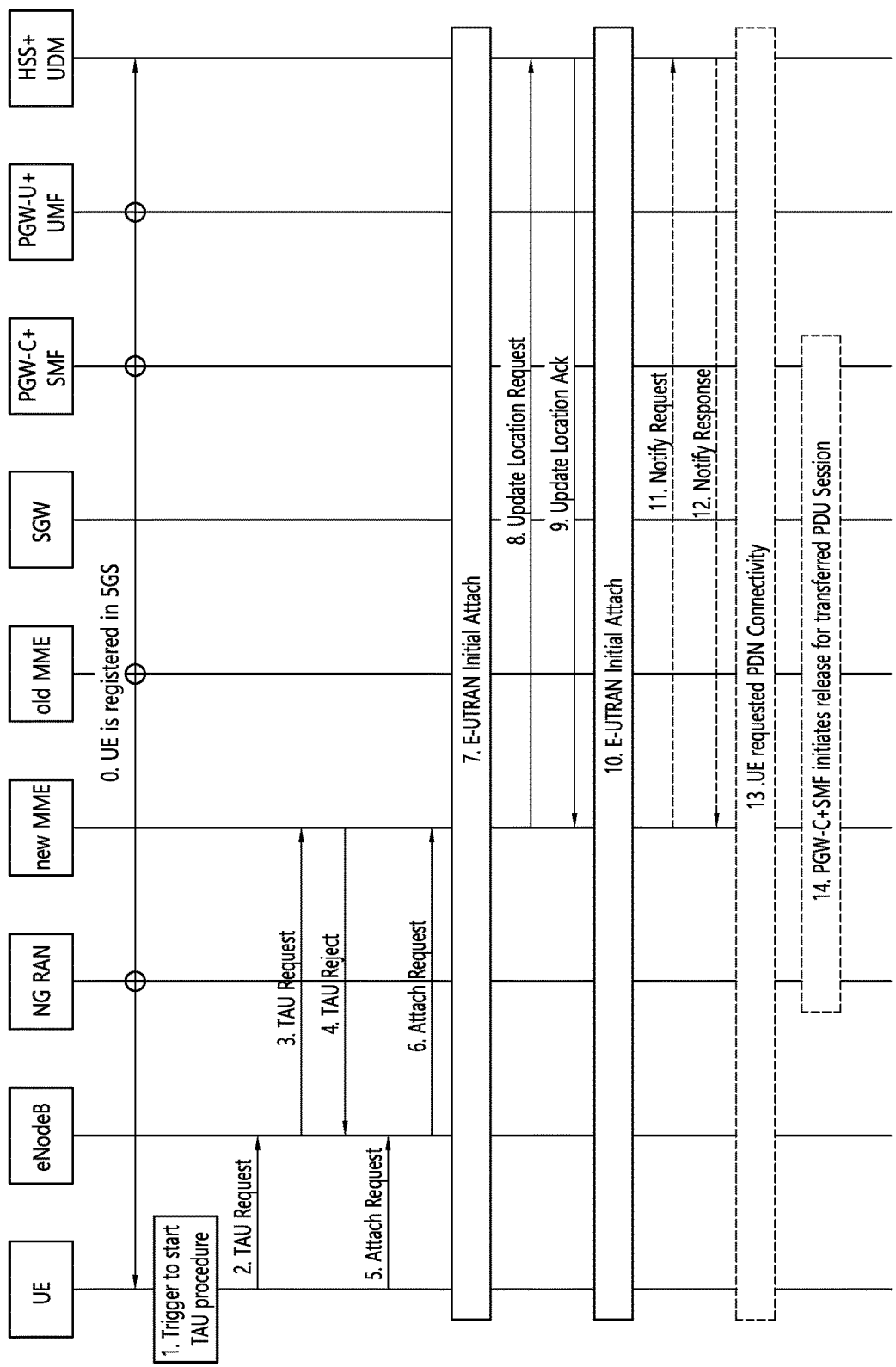
FIG. 7 shows a procedure of moving from 5GS to EPS when there is no N26 interface.

FIG. 7 shows a procedure of moving from 5GS to EPS when there is no N26 interface.

The UE which operates in the single registration mode may perform processes 1 to 5 below. However, the UE which operates in the dual registration (DR) mode may first perform process 5 without performing processes 1 to 4.

Memo 1: For preserving an IP address, the UE which operates in the single registration (SR) mode may also first perform process 5. However, when the IP address preserving is not supported, the UE which operates in the single registration mode may first perform process 1.

0) The UE is registered in the 5GS.

1) The UE is determined to perform the TAU procedure.

2) The UE transmits a TAU request message in order to perform the TAU procedure. The TAU request message includes 4G-GUTI mapped with globally unique temporary id (5G-GUTI). The UE may piggyback information for informing movement from the 5GS in the TAU request message.

3) eNodeB (i.e., base station) transmits the TAU request message to a new MME.

4) When the new MME determines that the previous node is the AMF from GUTI of UE mapped from the 5G-GUTI and when the MME supports interworking between the 5GS and the EPS without the N26 interface, the MME transmits a TAU rejection message to the UE.

5) The UE transmits an attach request message. The attach request message is generated as follows.

When the UE operates in the single registration mode, the UE piggybacks information indicating that the UE moves from the 5GS and 4G-GUTI mapped from the 5G-GUTI in the attach request message.

When the UE operates in the dual registration mode, the UE piggybacks the information indicating that the UE moves from the 5GS and the 4G-GUTI in the attach request message.

In process 2 above, the UE transmits the TAU request message, but the MME may not acquire a UE identifier, and as a result, when a TAU request is rejected, the UE piggybacks IMSI in the attach request message.

When the UE wants to move the PDU session to the EPC as part of the attach request procedure, the UE piggybacks a PDN connectivity request message in the attach request message. The PDN connectivity request message may include a request type set to "Handover", a Data Network Name (DNN)/Access Point Name (APN), and a PDU session ID. The UE piggybacks the PDU session ID in a Protocol Configuration Option (PCO).

In process 2 above, when the TAU request message is transmitted, but the TAU request is rejected, the IP address preserving may not be provided. In this case, the UE piggybacks the IMSI in the attach request message. In addition, when the IMSI is already included in the attach request message, the UE may not piggyback the request type set to "Handover" in the PDN connectivity request message.

The UE may provide an EPS ID to all EPS bearers mapped in EPS bearer state information. If there is an initial attach request, the EPS bearer state information may be empty.

Memo 2: When the network is set to support interworking between the 5GS and the EPS without the N26 interface, the UE may know this. The UE may not piggyback EPS bearers corresponding to 5G QoS flows in the EPS bearer state information.

6) The eNB transmits the attach request message to the new MME.

7) The initial attach procedure for E-UTRAN is performed.

When the UE provides 4G-GUTI mapped from 5G-GUTI and when the MME is set to support interworking between the 5GS and 4PS without the N26 interface, the MME may not transmit an identifier request message to previous MME/SGSN/AMF.

Memo 3: If the 4G-GUTI mapped from the 5G-GUTI is an identifier which may not be known by the MME, the MME may transmit an identifier request message to the UE in order to request the IMSI.

8) The new MME transmits a location update request message to HSS+UDM.

When the MME determines that the previous node is the AMF based on information acquired from the UE and when the MME is set to support interworking between the 5GS and the 4PS without the N26 interface, the MME may not transfer information indicating an initial attach to the HSS+UDM. The HSS+UDM may not transmit a location cancellation message to the previous AMF.

Memo 4: When the UE does not maintain registration in the 5GC and when a reachability time has expired, the AMF implicitly detaches the UE. In addition, remaining PDU sessions in the 5GC are released as much as possible.

9) The HSS+UDM transmits a location update response message to the new MME.

10) The initial attach procedure for E-UTRAN is performed.

The MME determines an address of PGW-C+SMF for a Create Session Request based on APN acquired from the UE and a subscriber profile acquired from HSS+UDM.

The PGW-C+SMF uses a PDU session ID in order to associate the transferred PDU connection with a PDU session in the 5GC.

PGW-U+UPF starts routing downlink data packets to S-GW.

11-12) The new MME transmits a notification request message to the HSS+UDM and receives a response message.

13) When the UE has a PDU session to be transferred to the EPS and the UE wants to use the same IP address/prefix as it is, the UE performs the PDN connection procedure requested by the UE. In this case, the request type in the PDU connection establishment request message is set to "handover". The UE includes an APN and a PDU session ID corresponding to a PDU session which the UE wants to move to the EPS.

The UE which operates in the single registration mode performs the process for each PDU session immediately after completing the initial attach procedure for the E-UTRAN. The UE which operates in the dual registration mode may perform the process at any time after completing the initial attach procedure for the E-UTRAN.

The MME determines an address of PGW-C+SMF for the Create Session Request based on the APN acquired from the UE and the subscriber profile acquired from the HSS+UDM. Further, the MME may determine when the HSS+UDM should inform the MME of an ID of new P-GW/SMF.

The PGW-C+SMF may use the PDU session ID in order to associate the PDU session to be transferred with the PDU session in the 5GC.

As a result of the procedure, the PGW-U+UPF may start routing downlink data to the S-GW.

14) The PGW-C+SMF may start releasing the PDU session in the 5GS to be transferred to the EPS.

2. Moving from EPS to 5GS

Hereinafter, a procedure in which UE in an idle state moves from the 5GS to the EPS in the single registration mode will be described.

The procedure may be used for the UE to be registered even in the 5GS when the UE is registered even in the EPC in the case of supporting the dual registration mode.

The UE may have a PDN connection including one or a plurality of EPS bearers. During PDN connection establishment, the UE may allocate a PDU session ID and transfer the allocated PDU session ID to the PGW-C+SMF through a Protocol Configuration Option (PCO).

Figure 8:
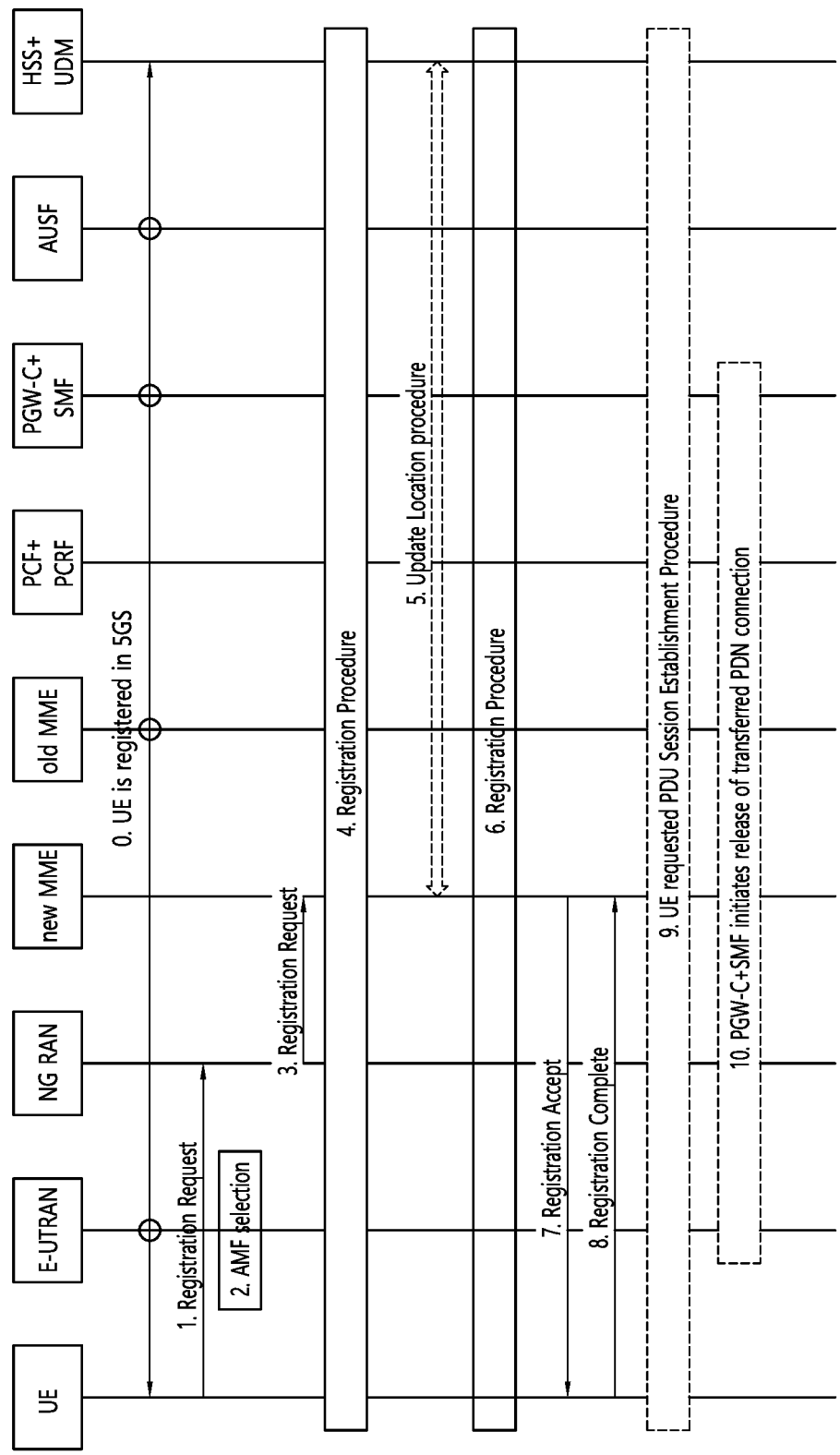
FIG. 8 shows a procedure of moving from EPS to 5GS when there is no N26 interface.

FIG. 8 shows a procedure of moving from EPS to 5GS when there is no N26 interface.

0) The UE is attached to the EPC.

1) The UE transmits a registration request message including information indicating that the UE moves from the EPC to the 5GS. The UE using the single registration mode may piggyback a registration type set to "movement registration update" and the 5G-GUTI mapped from the 4G-GUTI in the registration request message. The UE using the dual registration mode may piggyback a request type set to "initial registration" and the 5G-GUTI or a Subscription Permanent Identifier (SUPI) in the registration request message.

2) The NG-RAN performs AMF selection.

3) The NG-RAN transfers the registration request message to the selected AMF.

When the registration type in the registration request message is set to "movement registration update" and the information indicating that the UE moves from the EPC is included in the registration request message, the AMF may process the registration request like "initial registration" and skip a PDU session state synchronization procedure in the case of supporting the interworking procedure between the 5GS and the EPS without the N26 interface.

Memo 1: The UE which operates in the single registration mode may piggyback PDU session IDs corresponding to the PDN connection in the PDU session state information.

When the UE provides the 5G-GUTI mapped from 4G-GUTI and when the AMF is set to support interworking between the 5GS and the EPS without the N26 interface, the AMF may not perform a procedure of acquiring a UE context from the MME.

Memo 2: If the 5G-GUTI mapped from the 4G-GUTI is an identifier which is not known to the AMF, the AMF may transmit an identifier request message to the UE in order to request the SUPI. In this case, the UE transmits an identification response message including the SUPI.

4) A registration procedure is performed.

5) A location update procedure is performed.

When the UE piggybacks the information indicating that the UE moves from the EPC in the registration request message and when the AMF is set to support interworking between the 5GS and the EPS without the N26 interface, the AMF may not transfer information indicating "initial registration" to UDM. The UDM may not transmit a location cancellation request to the previous MME.

Memo 3: When the UE does not maintain registration in the EPC, as the reachability time has expired, the MME may detach the UE and release the PDN connection in the EPC.

6) The registration procedure is performed.

7) The new AMF transmits a registration accept message to the UE.

The registration accept message may include information indicating "interworking without N26".

When the UE provides the PDU session state information, the AMF may be set not to update the PDU state information.

8) The UE may transmit a registration complete message to the AMF.

9) The UE may perform a PDU session establishment procedure.

When the UE has PDU connections in the EPC to move to the 5GS and wants to maintain the same IP address/prefix, the UE performs the PDU session establishment procedure requested by the UE. The UE piggybacks a request type set to "legacy PDU session" in a PDU session establishment request message or piggybacks a request type set to "legacy emergency PDU session". The UE may provide a PDU session ID and DNN corresponding to a legacy PDN connection to move the UE from the EPS to the 5GS.

The UE which operates in the single registration mode may perform this process for each PDU connection just after performing process 8. The UE which supports the dual registration mode may perform this process at any time after process 8. Further, the UE which supports the dual registration mode may perform this process only for a subset of PDU sessions. The AMF may select SMF for a Namf_P-DUSession_CreateSMContext service based on the DNN acquired from the UE and the ID of PGW/SMF in a subscriber profile acquired from the HSS+UDM. Further, the AMF may determine when to notify an ID of new PGW-C+SMF in a subscriber profile in which the HSS+UDM is updated to the AMF. The AMF may piggyback the PDU session ID in a request message sent to the SMF.

The SMF may use the DNN and the PDU session ID in order to determine an accurate PDU session.

As a result of this procedure, the user plane is changed from the EPS to the 5GS.

10) The PGW-C+SMF performs a bearer deactivation procedure initiated by the PGW to perform a procedure for releasing a resource in the EPC for the PDN connection to be transferred from the 5GS.

<Control Plane Load, Congestion, and Overload Control>

Various measures are supported in order to guarantee that NFs in the 5G system operate under a nominal capacity for providing sufficient services and connections to the UE and protect the 5G system under various operating conditions (peaking operation time and extreme conditions). Various measures include load (re)balancing, overload control, and NAS level congestion control.

<NAS Level Congestion Control>

Here, the NAS level congestion control may be applied to DNN, to S-NSSAI, and to DNN and S-NSSAI generally (i.e., for all NAS messages). The NAS level congestion control is achieved by providing a back-off timer to the UE. In order for a large number of UEs to avoid requests delayed due to the back-off timer from being (almost) simultaneously initiated, the 5GC should select a back-off timer value so as to prevent the delayed requests from being synchronized.

When the UE receives the back-off timer, the UE should not start any NAS signaling for applied congestion control i) until the back-off timer has expired, ii) the UE receives a mobile terminated request from the network, or iii) until the UE initiates the signaling for an emergency service or an access having a high priority.

The AMFs and the SMFs may apply the NAS level congestion control, but may not apply the NAS level congestion control to the access having the high priority and the emergency services.

Under a general overload condition, the AMF may reject NAS messages received from UEs using a random 5G-access network (AN). When the NAS request is rejected, the AMF may transmit a mobility management (MM) back-off timer to the UE and when the AMF maintains the UE context, the AMF may store a back-off time per UE. The AMF may immediately reject a random subsequent request transmitted from the UE until the stored back-off time has expired. While the MM back-off timer is running, the UE may not initiate even any NAS request except for a deregistration procedure, the access having the high priority, the emergency services, and the mobile terminated services. When a random deregistration procedure is terminated, the back-off timer is continuously running. While the MM back-off timer is running, when the UE is already in a connection management (CM)-connected state, the UE may perform registration for mobility registration update. When the UE receives a paging request or an NAS notification message from the AMF while the MM back-off timer is running, the UE should stop the MM back-off timer and initiate a service request procedure or a registration procedure for the mobility registration update.

The MM back-off timer should not influence cell/radio access technology (RAT)/access type and public land mobile network (PLMN) change. The cell/RAT and tracking area (TA) change should not stop the MM back-off timer. The MM back-off timer should not trigger PLMN reselection. The back-off timer stops when not equal PLMN but new PLMN is accessed.

The AMF should not reject the registration request message for the mobility registration update performed when the UE is already in the CM-connected state. In the case of CM-IDLE state mobility, the registration request message for the mobility registration update may be rejected and the MM back-off timer value may be included in the registration rejection message. Here, CM-CONNECTED refers to a state in which the UE has the NAS signaling connection with the AMF through Ni. Here, CM-IDLE refers to a state in which the UE has no NAS signaling connection with the AMF through Ni.

The AMF rejects the registration request messages or service request together with the MM back-off timer and when the MM back-off timer is larger than a value acquired by adding a periodic registration update timer and an implicit deregistration timer of the UE, the AMF adjusts a mobile reachable timer and/or implicit deregistration timer, and as a result, the AMF prevents the UE from being implicitly deregistered while the MM back-off timer is running.

<APN Based Session Management Congestion Control>

The APN based session management (SM) congestion control may be activated by the MME due to a congestion situation, for example.

When ESM congestion associated with the APN is detected, the MME may reject an EPS SM (hereinafter, referred to as ESM) request (e.g., PDN connection, bearer resource allocation, or bearer resource change request) from the UE and transmit a rejection message including an SM back-off timer. When the UE does not provide the APN, the MME may use the APN used in a PDN GW selection procedure.

The MME transmits, to the UE, an NAC deactivation EPS bearer context request message including the SM back-off timer to deactivate a PDN connection which belongs to congested APN. When the SM back-off timer is included in the NAS deactivation EPS bearer context request message, cause information indicating "reactivation requested" should not be set.

Memo 1: UE that does not support the SM back-off timer attempts the session management procedure again to still increase a load of the MME.

When a request without information indicating a low access priority is rejected by the MME, if the congestion control is activated for the APN, the MME may store an SM back-off time for each UE and APN. The MME may immediately reject a random subsequent request from the UE using the APN until the stored SM back-off time has expired. When the MME stores the SM back-off time for each UE and APN and the MME determines to transmit the session management request message to the UE accessing the congested APN, the MME initializes the SM back-off time before transmitting the session management request message to the UE.

When information on the SM back-off timer is included in an EPS session management rejection message or the NAS deactivation EPS bearer context request message, the UE should perform the following operation until the timer has expired.

When the APN is included in the rejected EPS session management request message or the SM back-off timer is included in the NAS deactivation EPS bearer context request message, the UE does not start the session management procedure for the congested APN. The UE may initiate the session management procedure for another APN.

When the APN is not included in the rejected EPS session management request message, the UE may not start session management requests of all PDN types without the APN. The UE may start the session management procedure for specific APN.

The SM back-off timer may not stop due to the cell/TA/PLMN/RAT change.

The UE may start the session management procedure for the access having the high priority and the emergency service even while the SM back-off timer is running When the UE receives a network initiated EPS session management request message for the congested APN while the SM back-off timer is executed, the UE should stop the SM back-off timer associated with the APN and respond to the MME.

When the UE is set to override the low access priority and the SM back-off timer is executed due to the received rejection message in response to a request having the low access priority, a higher layer of the UE may request the initiation of a session management procedure without the low access priority.

When the EPS SM back-off timer is operating, the UE may initiate a PDN disconnection procedure (e.g., transmission of a PDN disconnection request message).

Memo 3: The UE may not delete the associated SM back-off timer when disconnecting the PDN.

The UE should support a separate SM back-off timer for all APNs which may be activated by the UE.

The APN based on SM congestion control may be applied to NAS ESM signaling initiated from the UE on a control plane. The SM congestion control does not prevent transmission/reception of data. Further, the SM congestion control does not prevent initiation of the service request procedure in order to activate a user plane bearer using the APN under the ESM congestion control.

<APN Based Mobility Management Congestion Control>

The MME may perform the APN based congestion control for UE using specific APN by rejecting the attach procedure while transferring a mobility management (MM) back-off timer.

When the congestion control is activated for UEs using specific APN, the MM back-off timer may be transmitted to the UE by the MME.

When the MME maintains the UE context and when the MME rejects a request not including a low access priority indication, the MME may store the back-off time for each UE. The MME may immediately reject a random subsequent request from the UE until the stored back-off time has expired.

After rejecting the attach request, the MME may maintain subscriber data during a predetermined period. This enables rejecting subsequent requests without HSS signaling when a congestion situation due to the UEs using the specific APN is continued.

While the MM back-off timer is running, the UE may start the NAS request for the mobility management procedure. However, the UE may initiate the mobility management procedure for the access having the high priority and the emergency service even while the MM back-off timer is running. While the MM back-off timer is running, when the UE is already in a connected mode, the UE may perform tracking area update.

While the MM back-off timer is running, when the MM back-off timer starts by receiving the rejection message in response to the request having the low priority, the UE set to override the low access priority may start the mobility management procedure without the low access priority. The higher layer of the UE may request to activate the PDN connection without the low access priority. Further, the UE may have the activated PDN connection without the low access priority.

<Data Network Name (DNN) Based Congestion Control>

As one of NAS level congestion controls, a DNN based congestion control is used.

The DNN based congestion control is used to avoid and handle NAS signaling congestion of UE using specific DNN regardless of Single Network Slice Selection Assistance Information (S-NSSAI). Both the UE and the 5GC support functions for providing the DNN based congestion control.

The SMF rejects PDU session establishment/modification request messages transmitted from the UE together the back-off timer and DNN associated with the back-off timer to apply the DNN based congestion control for the UE. The SMF transmits, to the UE, a PDU session release request message together with the back-off timer to release a PDU session which belongs to the congested DNN. When the back-off timer is set in the PDU session release request message, a cause value "reactivation requested" should not be set.

When the DNN based congestion control is activated in the AMF, the AMF may provide an NAS transport error message for an NAS transport message for transporting a session management (SM) message. The NAS transport error message may include DNN associated with the back-off timer. While a back-off timer for specific DNN is running, the UE does not transmit any NAS message for the specific DNN.

Upon receiving the back-off timer for the DNN, the UE should perform the following operations until the timer has expired.

When the DNN associated with the back-off timer is provided, the UE should not initiate any SM procedure for the congested DNN. The UE may initiate SM procedures for other DNNs. When the UE moves to the EPS, the UE should not initiate any SM procedure for an access point name (APN) corresponding to the DNN.

When the DNN associated with the back-off timer is not provided, the UE does not initiate SM requests of a random PDU session type without the DNN. The UE may initiate session management procedures for specific DNN.

Cell/TA/PLMN/.RAT change, change of a non-trusted non-3GPP access network, or a change of an access type does not stop the back-off timer.

While the back-off timer is running, the UE may initiate SM procedures for emergency services and the access having the high priority.

When the UE receives the SM request message initiated by the network for the congested DNN while the back-off timer is running, the UE should stop the SM back-off timer associated with the DNN and respond to the 5GC.

The UE may initiate the PDU session release procedure (i.e., transmitting the PDU session release request message) while the back-off timer is running. In this case, the UE does not delete the associated back-off timer when disconnecting the PDU session.

The UE should support a separate back-off timer for all DNNs which may be used by the UE.

In order for a large number of UEs to avoid requests delayed due to the back-off timer from being (almost) simultaneously initiated, the 5GC should select a back-off timer value so as to prevent the delayed requests from being synchronized.

The DNN based SM congestion control may be applied to NAS SM signaling of the control plane initiated from the UE. The SM congestion control does not prevent initiating data transmission/reception or the service request procedure of the UE for activating a user plane connection to DNN which is a target of the SM congestion control.

Problems to be Solved Through Disclosure of Present Disclosure

1. First Problem

The DNN based congestion control may be applied to specific DNN for the UE which receives the service in the 5GS. In this case, the 5GC may provide a value of the SM back-off timer to the UE and the UE may not transmit an additional SM request message (e.g., a PDU session establishment request message, a PDU session modification request message, etc.) to the corresponding DNN until the timer has expired. However, transmission of the PDU session release request message and reception of a mobile terminated (MT) signaling are enabled. In this case, the DNN based SM back-off timer being running by the UE operates without stopping even when the RAT/system is changed and continuously prevents additional requests to the same DNN/APN.

Further, in the opposite case, the DNN based congestion control may be applied to specific DNN for the UE which receives the service in the EPS. In this case, the EPC may provide a value of the SM back-off timer and the UE may not transmit an additional SM request message (e.g., a PDU session establishment request message, a PDU session modification request message, etc.) to the corresponding APN until the timer has expired. However, transmission of the PDN disconnection request message and reception of the MT signaling are enabled. In this case, the APN based SM back-off timer being running by the UE operates without stopping even when the RAT/system is changed and continuously prevents additional requests for the same DNN/APN.

In a situation in which serving PLMN for the UE has no N26 interface and the UE operates in the single registration mode, the following problem scenario may be considered. However, the following problem scenario occurs even in the dual registration mode (in particular, when operating a single radio).

1-1. Problems which May Occur when Moving from 5GS to EPS

1) After the UE is registered in the 5GS, the UE receives the service by generating one or more PDU sessions.

2) A problem (e.g., congestion) occurs in one (e.g., DNN/APN #1) of DNNs being used by the UE in the 5GS, and as a result, the DNN based congestion control is applied to the corresponding DNN. In other words, the UE receives the back-off timer for DNN/APN #1 from the 5GC and is driving the back-off timer.

3) When the UE moves to the EPS, the UE does not have the N26 interface, and as a result, the UE performs the TAU procedure or attach procedure for interworking. A main reason for the UE to move from the 5GS to the EPS is that the UE tries to escape the coverage of the 5GS.

4) In this case, when the PDN connectivity request message is included in the attach request message and when the PDN connection establishment request is for DNN/APN #1, the UE is applying the DNN/APN based congestion control to the corresponding DNN/APN #1 (i.e., is running the associated back-off timer), and as a result, the UE may not transmit the attach request message to the network. It should be noted that due to the reason that the DNN/APN generated during the attach process is being applied with the congestion control, the UE may not be registered in the EPS even though the UE escapes the 5GS.

5) Even if a PDN connection to which the DNN/APN based congestion control is not applied is requested during the attach process and the UE is thus successfully registered in the EPS, a PDN connectivity request for the DNN/APN used by the remaining PDU session should be subsequently performed for the service of the legacy PDU session. However, when the congestion control is applied to the DNN/APN #1 in the 5GS (i.e., when the back-off timer is running), the PDN connection creation therefor is prevented from being requested in the EPS.

6) Since the network does not have the N26 interface, an operation in EPS/5GS common PGW-U+UPF is required in order to move the PDU session of the 5GS to the PDN connection of the EPS. However, since the UE may not make a PDN connectivity request in order to move, to the EPS, the PDU session for the DNN/APN in which the back-off timer is running during process 4 or 5, downlink of the corresponding session registered on the PGW-C+SMF is still on the 5GS side. The reason is that since the UE may not perform the operation of transporting the PDU session of the 5GS to the EPS through the attach procedure or through the PDN connection establishment procedure, the PDU session is still serviced in the 5GS. If mobile terminated (MT) data is generated for the DNN/APN #1 to which the DNN/APN based congestion control is applied, the PGW-U+UPF receiving the mobile terminated (MT) data notifies to the PGW-C+SMF that the mobile terminated (MT) data arrives and notifies to the AMF regarded as a serving node of the current UE that the mobile terminated (MT) data arrives. Since the UE currently moves to the EPS or escapes the 5GS, even though the AMF transmits the paging signal to the UE, the UE may not respond thereto and the mobile terminated (MT) data is lost. Alternatively, when the user plane is still activated between the PGW-U+UPF and the NG-RAN, the PGW-U+UPF transmits the mobile terminated (MT) data to the NG-RAN, but the UE may not receive the mobile terminated (MT) data. In other words, in general, even though the DNN/APN based congestion control is applied, there should be a problem in receiving the mobile terminated (MT) data, but there is a problem that the mobile terminated (MT) data may not be received due to an inter-system change.

Figure 9B:
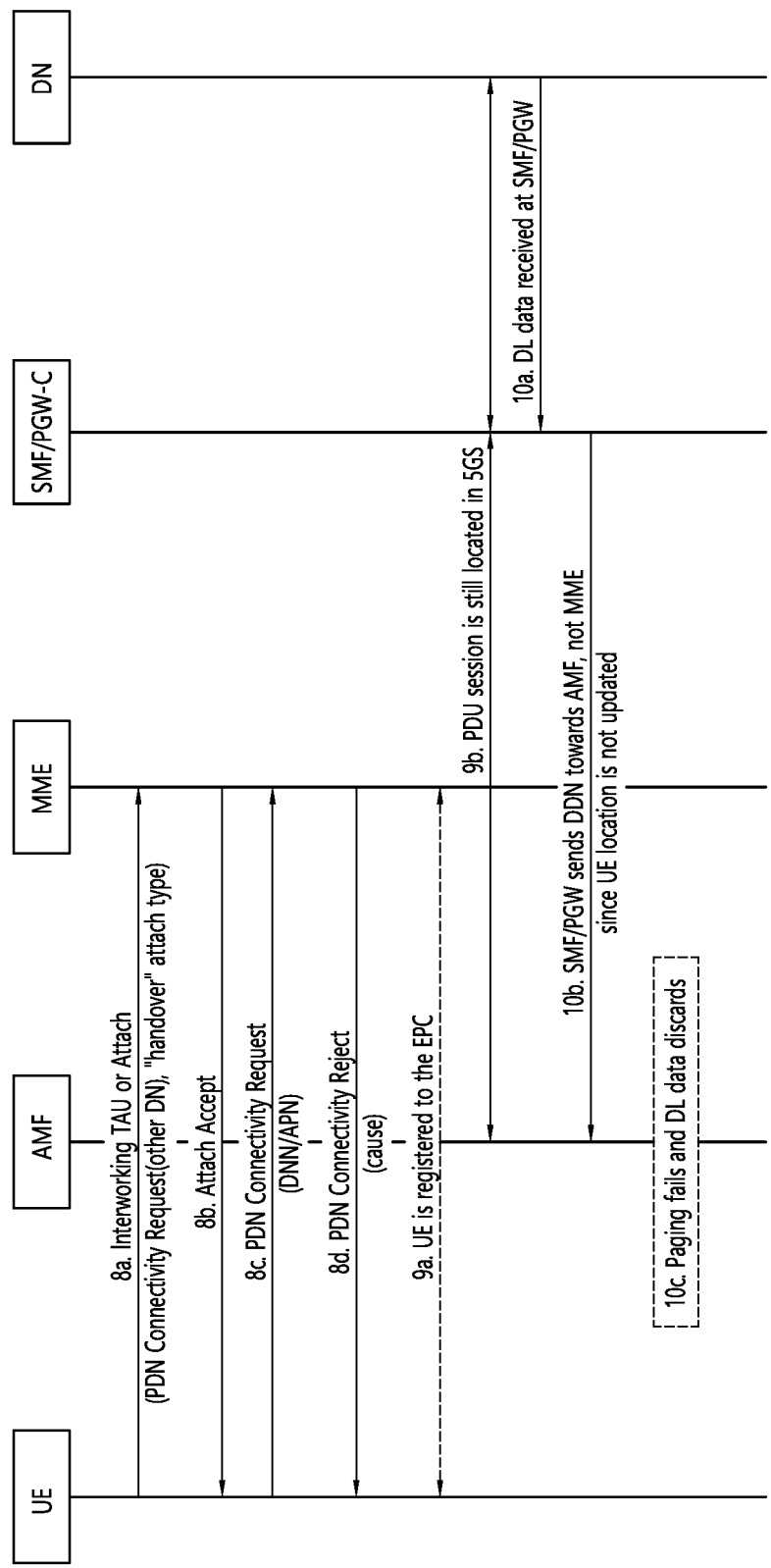

FIGS. 9A and 9B show a problem which may occur in a procedure of moving from 5GS to EPS when there is no N26 interface.

1) In the drawings, interworking between the EPS and the 5GS or between the EPC and the 5GCN without the N26 interface is considered.

2) The UE is registered in the 5GS and receives the service from specific DN.

3) If the congestion occurs in the corresponding DN, the SMF may apply the DNN based congestion control.

4) The SMF performs transmission of the rejection message or session release for the SGSM request of the UE and transfers the value of the back-off timer associated with the DNN to the UE. Alternatively, when the corresponding information is transferred to the AMF and a UL NAS TRANSPORT message containing the SM request is received, the AMF may preemptively apply the congestion control and transfer the value of the corresponding back-off timer through a DL NAS TRANSPORT message.

5) The UE receiving the value of the back-off timer executes a back-off timer (e.g., T3396) in association with the corresponding DNN/APN. While the back-off timer is running, the UE may not send the SM request message to the corresponding DNN/APN.

6) The UE moves from the 5GS to the EPS for a predetermined reason (e.g., mobility).

7) The UE transmits the TAU request message or the attach request message for interworking so as to be registered in the EPS. Alternatively, when the UE first transmits the TAU request message and then receives the rejection message, the UE immediately transmits the attach request message. The UE may basically piggyback the PDN connectivity request message in the attach request message and transmit the PDN connectivity request message in order to establish the PDN connection to be used. If the PDN connectivity request message for the DNN/APN to which the congestion control is applied is transmitted, the PDN connectivity request procedure may be unsuccessful due to the congestion of the corresponding DN and in this case, the attach request may also be unsuccessful according to setting of the EPC.

8) If only the attach request is supported to be made without establishing the PDU connection or a PDN connectivity request to another DNN/APN other than the congested DNN/APN is made, the attach procedure is successful. However, in the network without the N26, the PDN connectivity request should be separately performed in order to move from a legacy used PDU session to a new system. However, when the DNN/APN is congested, the corresponding SM request may also be unsuccessful.

9) Since the PDU session connected to the 5GS may not be transferred through processes 7 and 8, the corresponding PDU session is still connected to the 5GS on the system, but the UE is actually registered in the EPC.

10) Thereafter, when downlink data is generated in the corresponding PDU session, the SMF/PGW may downlink a message such as Downlink Data Notification (DDN), etc., to the 5GS known as a current location of the PDU session. When the AMF rejects the message or related information is not updated, the AMF may transmit the paging signal, but this will be all unsuccessful. In the worst case, a problem may occur in that the downlink data is discarded.

1-2. Problems which May Occur when Moving from EPS to 5GS

1) The UE receives the service by generating one or more PDN connections after attaching to the EPS.

2) When a problem (e.g., congestion) occurs in one (e.g., DNN/APN #1) of APNs being used by the UE in the EPS, the APN based congestion control is applied. In other words, the UE receives the back-off timer for DNN/APN #1 from the EPC and runs the back-off timer.

3) Since there is no N26 interface between the 5GS and the EPS, when the UE moves to the 5GS, the UE performs the registration procedure. A main reason for the UE to move from the EPS to the 5GS is that the UE tries to escape the coverage of the EPS.

4) The UE performs the PDU session establishment procedure for transporting the PDN connection serviced through the EPS to the 5GS after performing the registration procedure in the 5GS. However, when the congestion control is applied to the DNN/APN #1 in the EPS (i.e., when the back-off timer is running), the UE is prevented from requesting the PDU connection establishment to the 5GS.

5) Since there is no N26 interface between the 5GS and the EPS, an operation in EPS/5GS common PGW-U+UPF is required in order to move the PDN connection of the EPS to the PDU session of the 5GS. However, since the UE may not make a PDN creation request for transporting, to the 5GS, the PDN connection for the DNN/APN in which the back-off timer is running during process 4, downlink of the corresponding session registered on the PGW-C+SMF is still on the EPS side. In other words, the reason is that since the UE may not perform an operation of transporting the PDN connection of the EPS to the 5GS through the PDU creation request, the PDN connection is still maintained in the EPS.

If the mobile terminated (MT) data is generated for the DNN/APN #1 to which the DNN/APN based congestion control is applied, the PGW-U+UPF receiving the mobile terminated (MT) data notifies to the PGW-C+SMF that the mobile terminated (MT) data arrives, the PGW-C+SMF notifies to the S-GW that the mobile terminated (MT) data arrives, and the S-GW notifies to the MME that the mobile terminated (MT) data arrives. Since the UE currently moves toward the 5GS, even though the MME transmits the paging signal to the UE, the UE may not respond thereto. Consequently, the mobile terminated (MT) data is lost. Alternatively, when the user plane is still present between the S-GW and the eNB, the S-GW transmits the mobile terminated (MT) data to the eNB, but the UE may not receive the mobile terminated (MT) data. In other words, in general, even though the DNN/APN based congestion control is applied, there should be a problem in receiving the mobile terminated (MT) data, but there is a problem that the mobile terminated (MT) data may not be received due to the inter-system change.

Figure 10A:
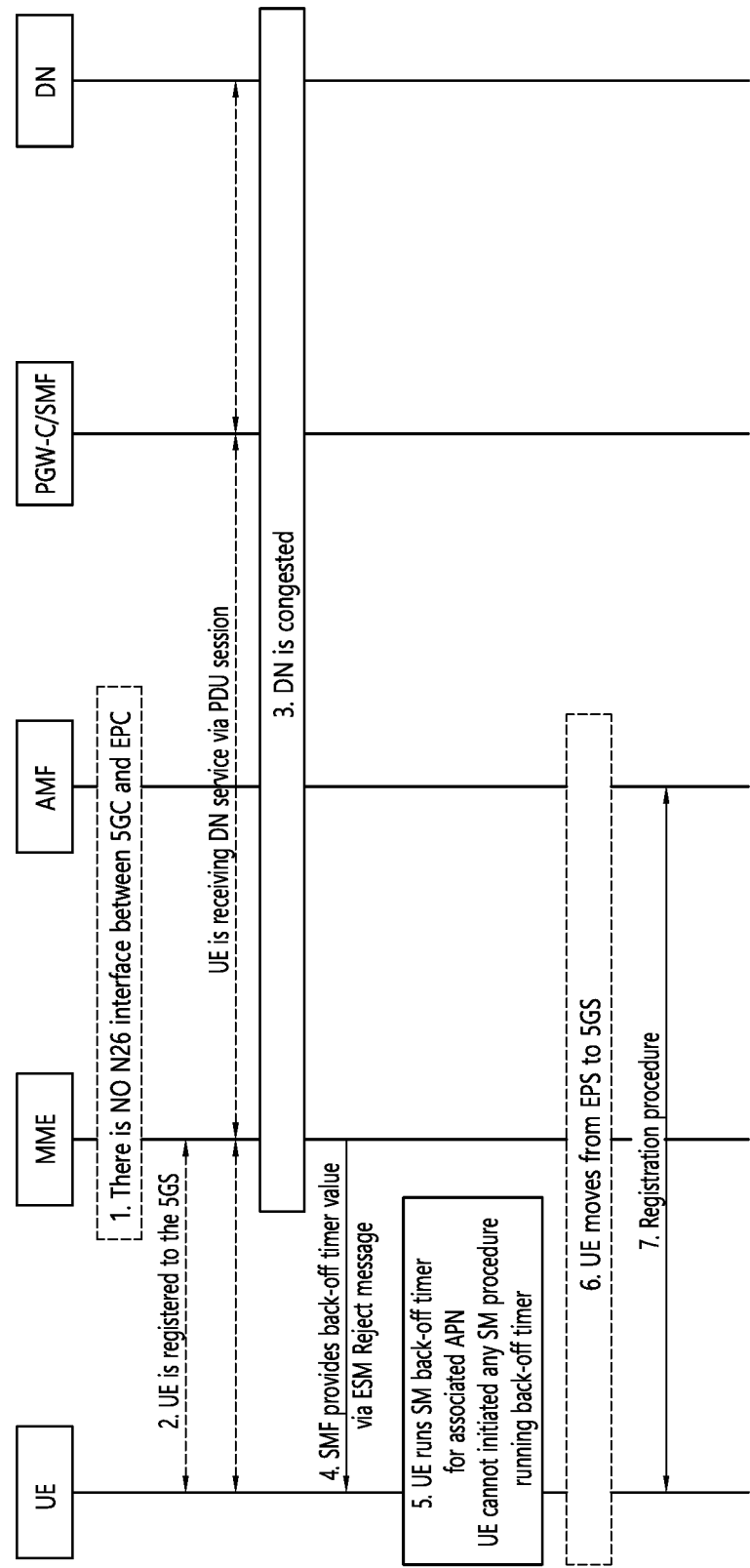
FIGS. 10A and 10B show a problem which may occur in a procedure of moving from EPS to 5GS when there is no N26 interface.
Figure 10B:
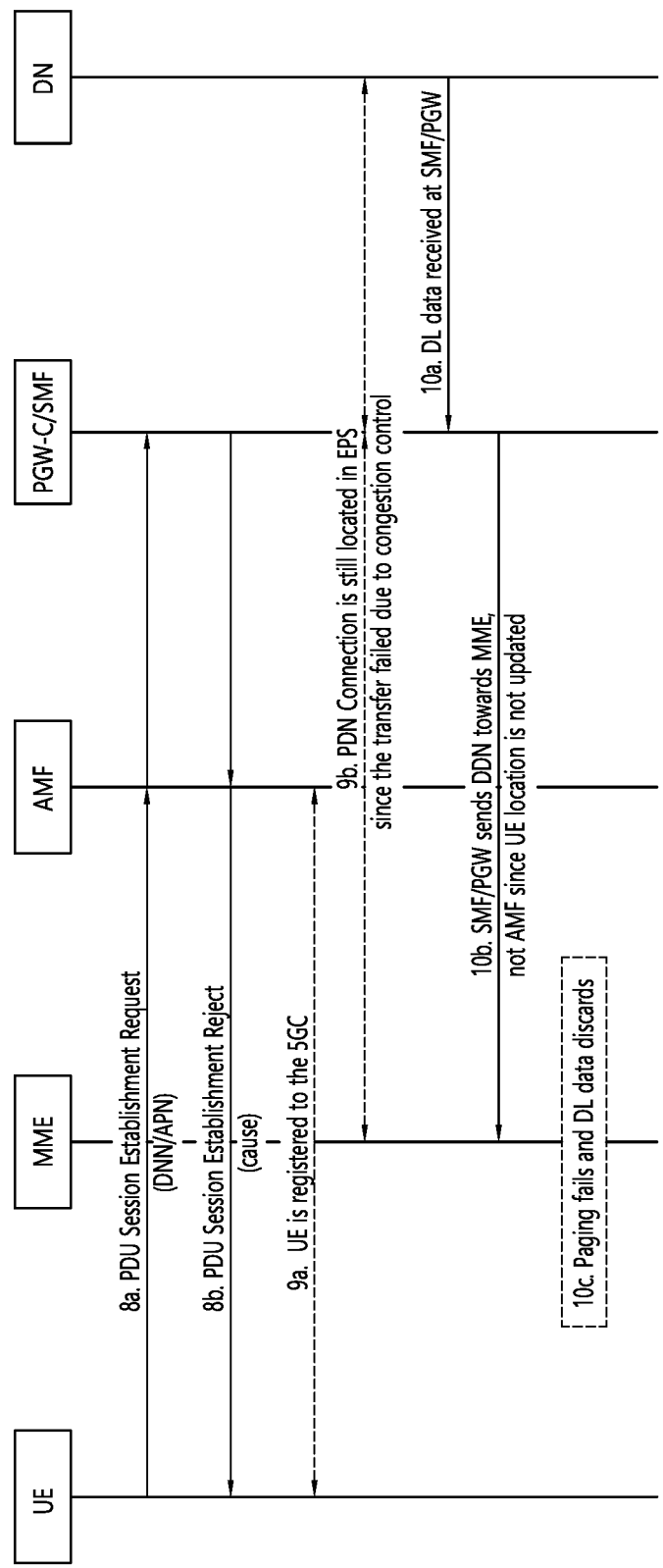

FIGS. 10A and 10B show a problem which may occur in a procedure of moving from EPS to 5GS when there is no N26 interface.

1) In FIG. 10, an example of interworking between the EPS and the 5GS or between the EPC and the 5GCN without the N26 interface is shown.

2) The UE is registered in the EPS and receives the service from specific DN (e.g., divided into DNN/APN).

3) If the congestion occurs in the corresponding DN, the PGW/SMF and the MME may apply the APN based congestion control.

4) The MME performs rejection for an ESM request of the UE and transfers the value of the back-off timer associated with the corresponding APN/DNN to the UE.

5) The UE receiving the value of the back-off timer runs the back-off timer (e.g., T3396) in association with the corresponding DNN/APN. While the back-off timer is running, the UE may not send the SM request to the corresponding DNN/APN.

6) The UE moves from the EPS to the 5GS for a predetermined reason.

7) The UE performs the registration procedure so as to be registered in the 5GS.

8) The UE should perform the SM request procedure, i.e., transmission of the PDU session establishment request message in order to move the legacy used PDN connection to a new system. However, when the DNN/APN is congested, the SM request may also be unsuccessful.

9) Since the PDN connection connected to the EPS is not transferred during process 8, the PDN connection is still connected to the EPS, but the UE is actually registered in the 5GS.

Thereafter, when downlink data using the corresponding PDN connection is generated, the SMF/PGW may downlink a message such as Downlink Data Notification (DDN), etc., to the EPS in which the PDN connection is known to be currently present. When the MME rejects the message or related information is not updated, the MME may transmit the paging signal, but this will be all unsuccessful. In the worst case, the downlink data may be discarded and lost.

2. Second Problem

A situation is assumed in which the UE supporting the single registration mode moves from the EPC to the 5GC in a network with the N26 interface. A situation in which the UE supports a reflective quality of service (QoS) function is assumed. Here, the reflective QoS is as follows. QoS for uplink may be implemented by reflecting QoS for downlink.

In other words, the UE may be configured to transmit uplink data at a level equal to a QoS level for the received downlink data. Such a QoS management or guarantee mechanism is referred to as a reflective QoS scheme. When the UE supports the reflective QoS function, the UE should notify to the network (SMF) that the UE supports the reflective QoS function through a PDU session modification procedure. Specifically, when the UE supports the single registration mode and the network supports interworking using the N26 interface and when the UE moves from the EPS to the 5GS (including both movement in the idle state and movement in the connection mode state), the UE starts a session modification procedure in order to notify, to the network, the support of the reflective QoS.

However, if the UE is subjected to congestion control for specific APN/DNN in the EPC and moves to the 5GC, the SM request should be sent in order to notify the support of the reflective QoS for the session to the corresponding APN/DNN. However, since the congestion control for the corresponding APN/DNN is being applied, such a request may not be sent and the reflective QoS may not be normally applied in the 5GS.

<Disclosures of Present Disclosure>

The disclosures of the present disclosure has been made in an effort to present methods for solving a problem which may occur when a specific data network is in a congestion situation during interworking between the 3GPP based 5G system (5G mobile communication system and next-generation mobile communication system) and the EPS.

The disclosures of the present disclosure may be implemented by combining one or more methods/operations/configurations/steps of the followings.

I. First Disclosure of Present Disclosure: Overriding of DNN/APN Congestion Control The UE may be in the following situation. The UE is first registered in the 5GS and in this case, the UE may receive, from the network, information (e.g., an indication indicating that the interworking is supported without the N26 interface) for notifying that the interworking without the N26 is supported. Upon receiving the information or indication, the UE recognizes that the network supports the interworking without the N26 interface. The UE supports only single registration or supports dual registration, but may be in a state in which the UE may use only one radio (i.e., the UE may receive the service only from one system at once and not simultaneously receive the service from two systems at a time). However, the disclosure of the present disclosure is not limited only to the UE which may use only one radio.

The UE receives the service by creating one or more PDU sessions.

The UE is subjected to the congestion control for the specific DNN (e.g., DNN/APN #1) from the 5GS. In other words, the UE receives and applies the back-off timer for DNN/APN #1 from the 5GS. In this case, while the back-off timer for DNN/APN #1 operates in the corresponding 5GS, the UE may not perform an additional SM procedure for DNN/APN #1.

As the UE moves or a request for a specific capability occurs (e.g., a voice call), the inter-system change to the EPS may be requested. The UE currently operates in the single registration (SR) mode or supports the dual registration (DR) mode, but is using only one radio or the 5GS network which is currently serviced is in an environment without the N26 interface. When the inter-system change occurs, the UE stops both the DNN/APN based back-off timers which are currently operating. This may lead to the following detailed operation. Alternatively, a message transmission request according to the following detailed disclosure contents may be performed, but the DNN/APN based back-off timer which is operating in the UE may not be stopped, but may be continuously operated.

Except for the condition, the DNN/APN based back-off timer may not be stopped even when the inter-system change occurs as in the related art.

I-1. First Proposal of First Disclosure: Transmission of PDN Connectivity Request Message Including Information/Indication for Inter-System Change The UE stops all currently operating SM back-off timers when the inter-system change occurs in a specific situation as described above. Accordingly, at the time of accessing new CN (e.g., EPC) in order to move the PDU session between core networks (CNs), the PDN connectivity request message is piggybacked in the attach request message to request the PDN connection. Alternatively, the EPC and the UE that support transmission of the attach request message without including the PDN connectivity request message may request the attach request message without including the PDN connectivity request message. In this case, after EMM-REGISTERED state transition, the PDN connectivity request message for movement of the PDU session may be similarly transmitted. Alternatively, when two or more PDU sessions are being used through the 5GS and the DNN based congestion control is to be applied only to some thereof, the UE may transmit the attach request message including the PDN connectivity request message for the PDU session to which the congestion control is not applied. In addition, after EMM-REGISTERED state transition, the PDN connectivity request message for movement of the PDU session to which the congestion control is applied may be similarly transmitted. In this case, the ESM request message (i.e., the PDN connectivity request message included in the attach request message or the PDN connectivity request message not included in the attach request message and singly transmitted) may include information indicating that a purpose of the request is not a general purpose but a purpose for the inter-system change (i.e., transferred from the 5GC) or indicating that the purpose of the request is for movement of the session to a new system, such as update location reporting, etc., an indication, a flag, and the like. Alternatively, the information indicating movement from the 5GC may be included in the attach request message. The inter-system change related information/indication may be included only in the ESM request for the DNN/APN to which the DNN/APN based congestion control is applied or included in an ESM request for all DNN/APN regardless thereof.

In the related art, the MME transmits the value of the back-off timer to the UE together with ESM rejection when the corresponding APN/DNN is currently in the congestion situation and the ESM request message is a general ESM request. However, when the proposed inter-system change related information/indication is piggybacked in the ESM request message or attach request message (when the ESM request message is piggybacked in the attach request message), even though the congestion control is being applied to the corresponding APN/DNN, the network may process the corresponding ESM request without applying (or overriding) the congestion control to the UE. For example, when the MME receives the ESM request message and the inter-system change related information/indication is piggybacked in the request message, the MME may transmit a Create Session Request message to the S-GW without applying the congestion control to the corresponding request. The MME may optionally state and send that the corresponding request is not the general request but the request by the inter-system change in the Create Session Request message. The SGW transfers the corresponding request to the SMF+PGW-C together with processing of the received request. The SGW may also optionally state that the request is the request by the inter-system change.

When the SMF+PGW-C receives the corresponding request, the SMF+PGW-C overrides the congestion control (e.g., overrides the congestion control similarly to an overriding operation for the mobile terminated (MT) signal/data). This may be determined as network implementation or when information on the inter-system change is piggybacked in the requested message, such an operation may be performed. The corresponding session is set to be served through the legacy 5GS node in the SMF+PGW-C, but since the request is received through the new system (e.g., EPS), information of the legacy session is updated (e.g., updates a legacy UPF address to an SGW address). Further, DL direction tunnel information of UPF+PGW-U is updated. In addition, information (i.e., a context of the UPF, etc.) of the corresponding PDU session which remains on the 5GS side may be deleted through the corresponding operation.

When the creation of the session is successfully performed, the MME sends a response message to the UE. The MME may optionally transmit a success message (e.g., a PDN connection establishment accept message or an attach accept message including the PDN connection establishment accept message) to the UE. In this case, the MME may send the success message in the form of a general success message. Alternatively, the MME may optionally state and send the congestion control for the corresponding APN/DNN. The statement for the congestion control may be expressed in the message in the form of the value of the ESM back-off timer (T3396) for each piggybacked APN/DNN. Therefore, the ESM request for the location update purpose depending on the inter-system change is permitted and processed and an additional ESM request to the corresponding DNN/APN to which the congestion control is already applied may be prevented. If the UE transmits the request message without stopping the back-off timer when requesting the session/PDN connection to the new system, it may be unnecessary to transfer the value of the additional back-off timer to the UE. To this end, the UE may piggyback information indicating that the UE is running the back-off timer in the PDN connection creation request message.

I-2. Second Proposal of First Disclosure: PDN Connectivity Request in which Determination of Network for Inter-System Change is Required The UE stops all currently operating SM back-off timers when the inter-system change occurs in a specific situation as described above. Accordingly, at the time of accessing new core network (CN) (e.g., EPC) in order to move the PDU session between core networks (CNs), the PDN connectivity request message may be piggybacked in the attach request message and transmitted. Alternatively, the EPC and the UE that support transmission of the attach request message without including the PDN connectivity request message may request the attach request message without the PDN connectivity request message. In this case, after EMM-REGISTERED state transition, the UE may transmit the PDN connectivity request message for movement of the PDU session. Alternatively, when two or more PDU sessions are being used through the 5GS and the DNN based congestion control is to be applied only to some thereof, the UE may piggyback the PDN connectivity request message for the PDU session to which the congestion control is not applied in the attach request message and transmit the PDN connectivity request message. In addition, after EMM-REG- ISTERED state transition, the UE may transmit the PDN connectivity request message for movement of the PDU session to which the congestion control is applied.

In the related art, the MME transmits an ESM rejection message including the value of the back-off timer when the ESM request message is a general ESM request and when the corresponding APN/DNN is currently in the congestion situation. When the corresponding network has no N26 interface and when the ESM message includes separate information/indication indicating "inter-system change" or "session transfer" similarly as proposed in the first proposal of the first disclosure while the request type included in the corresponding ESM request message is "handover" or when the ESM message includes one of the ESM request type and the separate information/indication, the MME may process the corresponding request without rejecting the corresponding request. Alternatively, the MME may process the corresponding request without rejecting the corresponding request based on information indicating that the MME moves from the 5GC included in the attach request message. This follows the determination of the network and may be performed when the corresponding request is determined for the inter-system change and location update of the UE which uses the dual registration (DR) mode.

When the MME determines to process the corresponding request as in the first proposal of the first disclosure, transfer to the SGW and the SMF+PGW-C and session creation and context release in the 5GS may be performed. When the session/PDN connection is successfully created, the MME may transmit the PDN connection accept message (e.g., PDN Connectivity Accept) to the UE. In this case, as described in the first proposal of the first disclosure, the optional congestion control application (e.g., transfer of T3396 value) is also possible.

I-3. Third Proposal of First Disclosure: Overriding Congestion Control for PDU Session/PDN Connection Movement for Specific Service The operations described in the above proposals, in particular, methods for overriding the congestion control based on information in the SM message or additional information may be performed as follows.

The UE may not send the SM request message for movement of the PDU session or PDN connection to the corresponding APN/DNN when an inter-system change without the N26 (e.g., EPS→5GS or 5GS→EPS) occurs in a situation in which the congestion control is applied to specific APN/DNN like the scenario indicted in the problem.

The UE may override the back-off timer and send the SM request message for the purpose of transfer of the corresponding PDU session or PDN connection during a procedure in which the inter-system change occurs in the problem scenario and the UE is registered in the new system or thereafter. In this case, the UE may override the back-off timer only when the corresponding PDU session or PDN connection targets a specific service. The specific service may be classified into a separator, e.g., APN/DNN or an IP packet filter, etc. For example, when a network operator allows the override only for an IP multimedia subsystem (IMS) service, the UE may also may override the back-off timer and send the SM request message only when the APN/DNN is the IMS.

The UE may perform even determination as for whether the network accepts or rejects the SM request message for movement based on the specific service. As in the example, only when the APN/DNN is a value (e.g., IMS) previously set by the operator, the PDU session establishment or PDN connectivity request may be processed.

As described above, the network transfers the value of the back-off timer again to prevent additional signaling.

Figure 11:
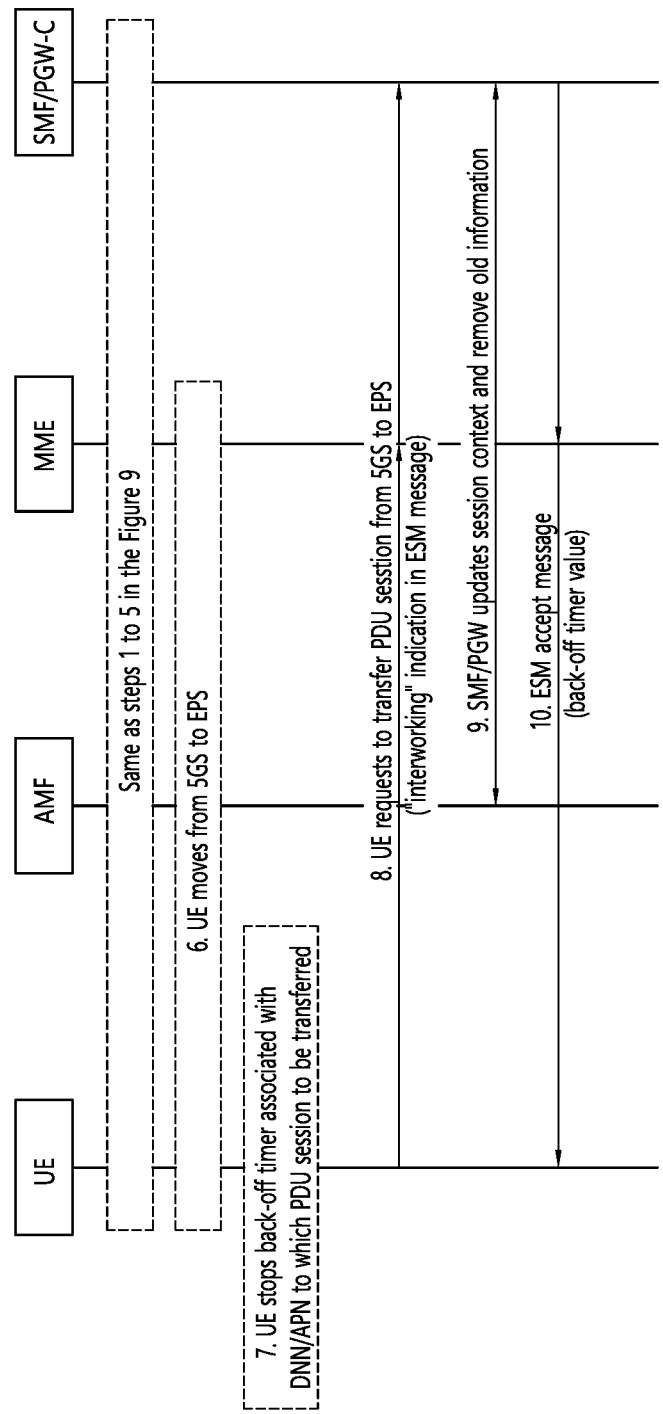
FIG. 11 is a signal flowchart showing one example of a method according to a first disclosure.

FIG. 11 is a signal flowchart showing one example of a method according to a first disclosure.

In FIG. 11, it is assumed that the UE is running by receiving the back-off timer in the legacy system (5GS).

1) The UE moves from the 5GS to the EPS.

2) When the UE determines that the session needs to be transferred between the systems, the UE may override the back-off timer which is running and transmit the ESM request message (e.g., PDN connectivity request message) for the corresponding APN/DNN. The PDN connectivity request message may be singly transmitted or piggybacked in the attach request message and transmitted. Here, the timer may be overridden only in the case of the PDU session for the specific service (e.g., specific APN for the IMS) as in the third proposal of the first disclosure.

3) The UE may piggyback, in the ESM request message (i.e., PDN connectivity request message), information/indication indicating that the corresponding request is session movement for the inter-system change at the time of transmitting the PDN connectivity request message.

4) Only in the case of the information/indication in the ESM request message provided by the UE or the specific service (e.g., the specific APN for the IMS) as described in the third proposal of the first disclosure, the network may override the congestion control and accept the corresponding request. For example, the SMF/PGW-C may perform an operation of updating the legacy context information and removing old information in an old node.

5) The MME transmits a success response message (e.g., PDN connection accept message) to the corresponding SM request. In this case, the network optionally processes the request, but may thereafter apply the congestion control again in order to prevent the additional signaling. For example, the MME may transfer the value of a new back-off timer to the UE.

II. Second Disclosure of Present Disclosure: Improvement of EPS Attach Request Procedure for Interworking with 5GS The second disclosure described below may be applied in the following situation as in the first disclosure.

The UE may be in the following situation. The UE is first registered in the 5GS and in this case, the UE may receive information (e.g., an indication indicating that the interworking is supported without the N26 interface) for notifying that the interworking without the N26 is supported from the network. Upon receiving the information or indication, the UE recognizes that the network supports the interworking without the N26 interface. The UE supports only single registration or supports dual registration, but may be in a state in which the UE may use only one radio (i.e., the UE may receive the service only from one system at once and not simultaneously receive the service from two systems at a time). However, the disclosure of the present disclosure is not limited only to the UE which may use only a single radio.

The UE receives the service by creating one or more PDU sessions.

The UE is subjected to the congestion control for the specific DNN (e.g., DNN/APN #1) from the 5GS. In other words, the UE receives and applies the back-off timer for DNN/APN #1 from the 5GC. In this case, while the back-off timer for DNN/APN #1 operates in the corresponding 5GS, the UE may not perform an additional SM procedure for DNN/APN #1. As the UE moves or a request for a specific capability occurs (e.g., a voice call), the inter-system change to the EPS may be requested. Since the network has no N26, the UE may transmit the attach request message or transmit the attach request message immediately without transmitting the TAU request message when the US is unsuccessful after the UE transmits the TAU request message to the EPC.

If the PDU session which the UE creates and uses in the 5GS is being applied to the DNN based congestion control, the UE may perform the following operation.

The UE may transmit the information the PDU session to which the DNN based congestion control is being applied, which is piggybacked in the attach request message. In this case, since the corresponding DNN/APN is currently in the congestion situation, there is a high possibility that the rejection message will be received again even though the PDN connectivity request message for the corresponding DNN/APN is transmitted as the UE overrides the back-off timer, and as a result, only the information of the PDU session is piggybacked in the attach request message and transmitted without transmitting the PDN connectivity request message. The PDU session information may include the DNN/APN information and the PDU session ID which are being used in the 5GC and may additionally include other required information.

The UE which operates in the single registration mode may piggyback information indicating all PDU sessions in order to optionally move all PDU sessions instead of stating individual PDU sessions in the scenario. The information may be expressed by information or indication indicating "All PDU Session transfer/HO request", for example. Alternatively, the information may be expressed by a wild card representing all sessions.

Piggybacking the information/indication in the attach request message by the UE may be implemented as follows.

1) Information element (IE) in attach request message
   The IE may be newly defined as an IE field in the attach request message and may include a plurality of session information in the form of a session to be transferred.
2) Protocol configuration option (PCO) in SM container included in attach request message
   The ESM request message such as the PDN connectivity request message for another session or default APN may be included in the attach request message or a new ESM message may be included. In this case, the PCO included in the corresponding ESM message may include related PDU session information.
   In this case, the IE may be applied even in a separate PDN connectivity request procedure other than the attach procedure.

When the additional information (i.e., PDU session information which needs to move) is included in the IE received from the UE, the MME may perform PDN connection creation for the corresponding sessions and a PDU session context deletion procedure in the 5GC. This is performed separately from the creation procedure of the PDN connection even though there is a PDN connectivity requested to be created together with the attach request. However, procedures such as actual user plane resource allocation and RAN setup may be omitted in addition to tunnel setting of the SGW and the PGW at the time of creating the PDN connection. However, session information update of the SMF+PGW-C should be particularly performed and this is to send the DDN to the core network (CN) which is currently serving the UE when the mobile terminated (MT) occurs thereafter. In other words, this is to, when the mobile terminated (MT) data/signal is generated, process the generated MT data/signal in the core network (CN) which is currently serving the UE.

If the UE requests the corresponding information piggybacked in the PCO, the MME forwards the PCO to the PGW. A subsequent operation may occur similarly to a default EPS bearer context activation procedure in the SMF+PGW-C.

When movement of the PDU session requested by the UE is completed by the CN, the MME transfers, to the UE, information including an EPS bearer ID and an IP address of the corresponding PDN connection. This may be similarly transferred in the form of IE of attach Accept or PCO.

Figure 12:
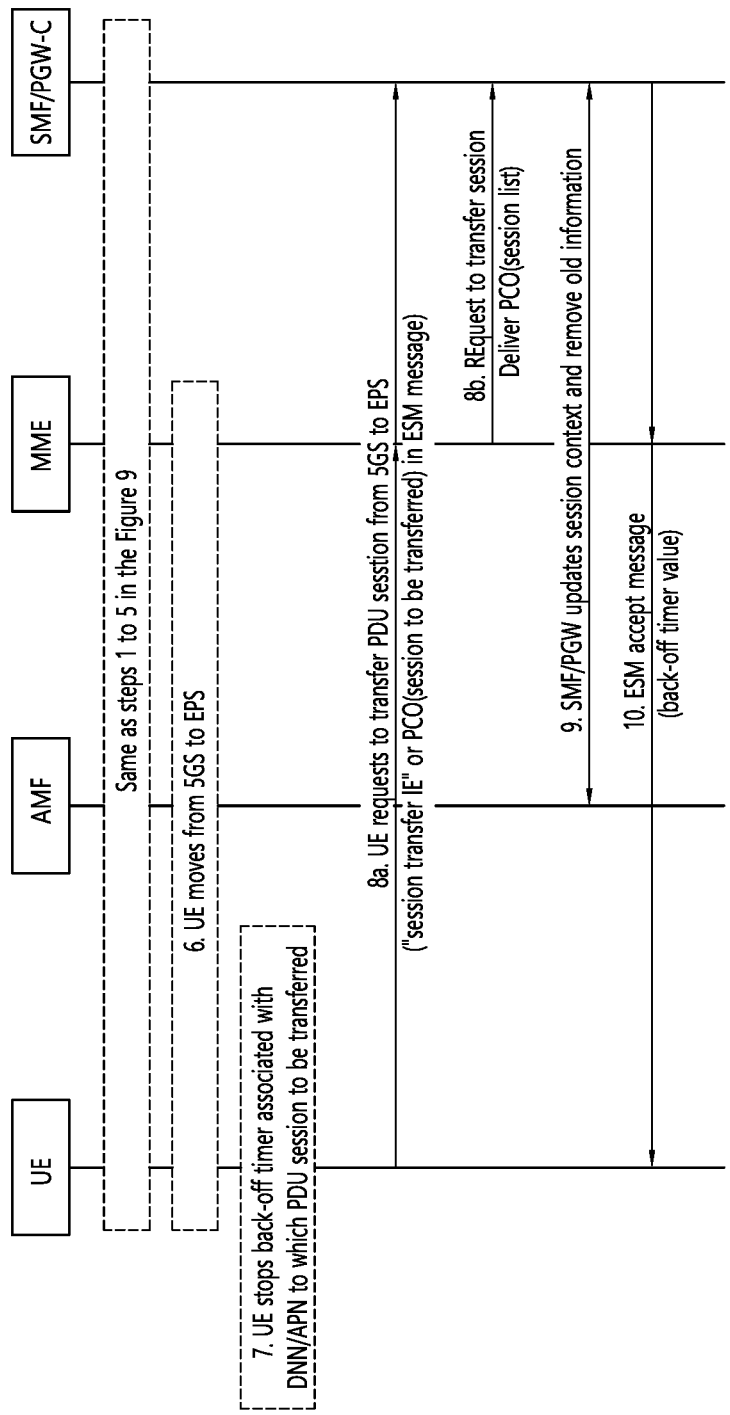
FIG. 12 is a signal flowchart showing one example of a method according to a second disclosure.

FIG. 12 is a signal flowchart showing one example of a method according to a second disclosure.

In FIG. 12, it is assumed that the UE is running by receiving the back-off timer in the legacy system (5GS).

1-5) Processes 1 to 5 shown in FIG. 12 are the same as or similar to processes 1 to 15 of FIG. 9. Accordingly, processes 1 to 5 shown in FIG. 12 are not described, but contents described by referring to FIG. 9 will be cited as it is.

6) The UE moves from the 5GS to the EPS.

7) When the UE determines to move the session between the systems, the UE may override the back-off timer which is running and transmit the ESM request message (e.g., PDN connectivity request message) for the corresponding APN/DNN. The ESM request message (e.g., PDN connectivity request message) may be singly transmitted or piggybacked in the attach request message and transmitted.

Alternatively, in the case of third proposal of the first disclosure, overriding the back-off timer may be performed only in the case of a PDU session for a specific service (e.g., specific APN (IMS)).

8) The UE piggybacks information on the session to move in the form of the IE in the attach request message to indicate that the PDN connectivity request is for session movement. The information on the session to move may include information on a plurality of sessions. Alternatively, the information may be included in the PCO in the ESM request message (e.g., PDN connectivity request message).

When the information is included in the attach request message or the information is included in the PCO in the ESM request message, the MME sends a movement request (or PDN connection creation request) for the corresponding session to the PGW-C+SMF or transfers the PCO.

9) The PGW-C+SMF may override the congestion control according to the information (i.e., the information on the session to move) in the PCO provided by the UE or the information transferred from the MME and process the received request. For example, the SMF/PGW-C may update the legacy context information and remove/delete the old information of the old node.

10) The MME transmits the success response message (e.g., PDN connection accept message) to the corresponding SM request message. In this case, the MME optionally processes the request, but may thereafter apply the congestion control again in order to prevent the additional signaling. For example, the MME may transfer the value of the new back-off timer to the UE.

The contents described in the first and second disclosures may be applied only when the UE performs the attach procedure. If the DNN/APN to which the SM back-off timer is being applied is for the PDN connectivity request included in the attach request message, the attach request message may be transmitted to the MME. Therefore, when the requested PDN connection is not the PDN connection created during the attach procedure, the associated DNN/APN does not perform the operation, but waits until the back-off timer has expired if the SM back-off timer is running. As such, the reason for overriding the application of the congestion control to the PDN connection created and requested during the attach procedure and permitting the movement from the 5GS to the EPS to be requested is to resolve a problem in that it is impossible for all PDN connections to move to the EPS by rejecting the attach request (+PDN connectivity request) by the congestion control even though the congestion control based on the SM back-off timer is not applied to PDN connections which are requested to move after the attach procedure is successful.

For example, prior to the disclosure of the present disclosure, according to the related art, a problem occurs in the following example.

A situation is assumed in which the UE has PDU session #1 detouring DNN #1 (using APN #1), PDU session #2 detouring DNN #2 (using APN #2), and PDU session #3 detouring DNN #3 (using APN #3). In this case, it is assumed that the congestion control is applied to DNN #1, and as a result, the back-off timer is running for DNN #1. In addition, a situation is assumed in which the UE moves from the 5GS to the EPS. In this case, prior to the disclosure of the present disclosure, according to the related art, since the back-off timer for DNN #1 (i.e., APN #1) is running, the UE may not transmit the attach request message to DNN #1 by using APN #1. Further, since the UE may not attach to the 5GS, there is a problem in that the PDN connectivity request message for moving PDU session #2 and PDU session #3 to the 5GS may not be transmitted.

However, according to the first and second disclosures of the present disclosure, the UE may transmit the attach request message to DNN #1 by using APN #1. Further, when the attach procedure is successful, the UE may transmit the PDN connectivity request message for moving PDU session #2 and PDU session #3 to the 5GS.

On the contrary, since the PDN connection created during the attach procedure is not influenced by the back-off timer according to the congestion control as below, the UE may perform the attach. Meanwhile, in order to transport the PDU session influenced by the back-off timer according to the congestion control to the EPS, the PDN connectivity request message may be transmitted after the back-off timer has expired.

The situation is assumed in which the UE has PDU session #1 detouring DNN #1 (using APN #1), PDU session #2 detouring DNN #2 (using APN #2), and PDU session #3 detouring DNN #3 (using APN #3). In this case, it is assumed that the congestion control is applied to DNN #2, and as a result, the back-off timer is running for DNN #2. In addition, a situation is assumed in which the UE moves from the 5GS to the EPS. In this case, the UE may transmit, to DNN #1, the attach request message including the PDN connectivity request message by using APN #1. However, since the back-off timer for DNN #2 (i.e., APN #2) is running, the UE may not transmit the attach request message to DNN #2 by using APN #2. However, the UE may transmit the PDN connectivity request message using APN #3 to DNN #3.

III. Third Disclosure of Present Disclosure: EPS to 5GS Interworking

The contents of the first and second disclosures are described on the premise that the UE moves from the 5GS to the EPS, but the aforementioned contents may be applied even when the UE moves from the EPS to the 5GS. For example, when the UE which is running the ESM back-off timer according to the congestion control for specific APN/DNN moves from the EPS to the 5GS, 1) the UE may override the APN/DNN based congestion control or 2) piggyback the information on the corresponding session in the message in order to move the session to which the congestion control is applied during the registration procedure or at the time of transmitting the message for the PDU session establishment procedure thereafter. The contents described by referring to the first and second disclosures will be cited for detailed operations as it is. The contents of the first disclosure described above may be applied to interworking from the EPS to the 5GS as it is as follows.

The UE may be in the following situation. The UE is first registered in the EPS and in this case, the UE may receive information (e.g., an indication indicating that the interworking is supported without the N26 interface) for notifying that the interworking without the N26 is supported from the network. The UE supports only single registration or supports dual registration, but may be in a state in which the UE may use only one radio (i.e., the UE may receive the service only from one system at once and not simultaneously receive the service from two systems at a time).

The UE receives the service by creating one or more PDU sessions.

The UE is subjected to the congestion control for the specific DNN (e.g., DNN/APN #1) from the EPS. In other words, the UE receives and applies the back-off timer for DNN/APN #1 from the EPS. In this case, while the back-off timer for DNN/APN #1 operates in the corresponding EPS, the UE may not perform an additional SM procedure for DNN/APN #1.

As the UE moves or a request for a specific capability occurs (e.g., a voice call), the inter-system change to the 5GS may be requested. The UE currently operates in the single registration (SR) mode or supports the dual registration (DR) mode, but uses only one radio or the EPS network which is currently serviced is in an environment without the N26 interface. When the inter-system change occurs, the UE stops both the DNN/APN based back-off timers which are currently operating. This may lead to the following detailed operation.

Alternatively, a message transmission request according to the following detailed disclosure contents may be performed, but the DNN/APN based back-off timer which is operating in the UE may not be stopped, but may be continuously operated.

Except for the condition, the DNN/APN back-off timer may not be stopped even when the inter-system change occurs as in the related art.

III-1. First Proposal of Third Disclosure: Transmission of PDN Connectivity Request Message Including Information/Indication for Inter-System Change The UE stops all currently operating SM back-off timers when the inter-system change occurs in a specific situation as described above. Accordingly, in order to move the PDU session between the core networks (CNs), a registration procedure is first performed at the time of accessing a new CN (e.g., 5GC). Thereafter, the UE may transmit the PDU session establishment request message in order to move the PDN connection between the core networks (CNs). In this case, the SM request message (e.g., the PDU session establishment request message) may include information indicating that the purpose of the request is not a general purpose but the purpose for the inter-system change (i.e., transferred from the 5GC) or indicating that the purpose of the request is for movement of the session to the new system, such as update location reporting, etc., an indication, a flag, and the like. The inter-system change related information/indication may be included only in the SM request message for the DNN/APN to which the DNN/APN based congestion control is applied or included in the SM request for all DNN/

APN regardless thereof. Alternatively, the inter-system change related information/indication may be included in the registration request message prior to the PDN session establishment request.

According to the related art, when the SM request message is a general SM request and the corresponding APN/DNN is currently in the congestion situation, the AMF or SMF may transmit the value of the back-off timer piggybacked in the SM rejection message. If the inter-system change related information/indication proposed in the present clause is included in the SM request message transmitted by the UE, even though the congestion control is being applied to the corresponding APN/DNN, the network node (i.e., AMF or SMF) may process the SM request of the UE without applying the congestion control (or by overriding the congestion control). For example, when the information/indication is included in the SM request message received by the AMF, the AMF may override the DNN based congestion control and forward the message to the related SMF. If the SMF receives the SM request message and the inter-system change related information/indication is included in the SM request message, the SMF overrides the congestion control and accepts the SM request without rejecting the SM request. In other words, the SMF may transmit an N4 session establishment request message to the UPF without applying the congestion control to the corresponding request. Such an operation of the SMF may be performed based on internally implemented determination or performed based on the information on the inter-system change in the request message. The corresponding session is set to be served through the legacy EPS node in the SMF+PGW-C, but since the request is received through the new system (e.g., 5GS), information of the legacy session is updated (e.g., the legacy UPF address is updated to a UPF address). Further, DL direction tunnel information of UPF+PGW-U is updated. In addition, information (i.e., the context of the SGW, etc.) of the corresponding PDU session which remains on the EPC side may be deleted through the corresponding operation.

When the creation of the session is successfully performed, the SMF sends the response message to the UE. The SMF may optionally transmit the success message (e.g., PDU session establishment accept message) to the UE. In this case, the SMF may send the success message in the form of the general success message. Alternatively, the SMF may optionally state and send the congestion control for the corresponding APN/DNN. The statement for the congestion control may be piggybacked in the message in the form of the value of the ESM back-off timer (T3396) for each piggybacked APN/DNN. Therefore, the SM request for the location update purpose depending on the inter-system change is permitted and processed and an additional SM request to the corresponding DNN/APN to which the congestion control is already applied may be prevented.

III-2. Second Proposal of Third Disclosure: PDN Connectivity Request in which Determination of Network for Inter-System Change is Required The UE stops all currently operating ESM back-off timers when the inter-system change occurs in a specific situation as described above. Accordingly, at the time of accessing a new CN (e.g., 5GC) in order to move the PDN connection between core networks (CNs), the PDU session establishment request message may be transmitted after performing the registration through the registration procedure.

In the related art, the AMF or SMF transmits an SM rejection message including the value of the back-off timer when the SM request message is a general SM request and when the corresponding APN/DNN is currently in the congestion situation. If the corresponding network has no N26 interface and the request type included in the corresponding SM request message is "handover", the SMF may accept the corresponding request without rejecting the corresponding request. This follows the determination of the network and may be performed when the corresponding request is determined for the inter-system change and location update of the UE which uses the dual registration (DR) mode.

As in the first proposal of the third disclosure, if the AMF or SMF determines to process the corresponding request, transfer to the SMF+PGW-C, and session creation to the UPF and the context release in the EPC are performed. When the session/PDN connection is successfully created, the SMF may transmit the success response message (e.g., PDU session establishment accept message) to the UE. In this case, as described in the first proposal of the third disclosure, the optional congestion control application (e.g., transfer of T3396 value) is also possible.

IV. Fourth Disclosure of Present Disclosure: Reflective QoS Support Method

The following operation is proposed in order to solve the problem indicated in problem 2.

The singly registered UE may move to the 5GS after attaching to the EPC in the network supporting the N26. If the congestion control for the specific APN/DNN is applied in the EPC and the UE should notify reflective QoS support for the corresponding APN/DNN after moving to the 5GC, the UE may operate as one of the followings.

a) The UE stops the back-off timer for the corresponding APN/DNN and transmits the PDU session modification request message to the network node (e.g., SMF). In this case, the information/indication indicating the inter-system change, which is proposed in the first disclosure may be included in an MM part or SM message or in both the MM part and the SM message. When the corresponding indication/information is included, the SMF or AMF may exceptionally accept the request instead of rejecting the request. Optionally, similarly as proposed in the second disclosure, even though the UE does not directly transfer the information/indication, when the UE transmits the PDU session modification request message just after the inter-system change, the network may accept the request even though the corresponding DNN/APN is in the congestion state according to determination thereof. As in the first and second disclosures, the value of the SM back-off timer is included in the response message again to prevent an additional SM request.

b) Unlike the above clause a, even when the SM back-off timer is operating for the corresponding APN/DNN, the PDU session establishment request message may be exceptionally transmitted. In this case, the back-off timer which is operating continuously operates without stopping and the SM request is exceptionally permitted to be sent only for an operation for notifying whether to perform the reflective QoS support. Other operations may be performed similarly as proposed in the above clause a and however, when the SMF transmits the response message, the value of the additional SM back-off timer may not be included.

c) The UE piggybacks information for notifying that the reflective QoS is supported in the registration request message.

In the above description, it is described that the UE notifies the reflective QoS support after moving from the EPS to the 5GS, but this may be extensively applied even to a case where the UE notifies various SM capability information or whether to support the reflective QoS to the 5GC after moving from the EPS to the 5GS.

V. Fifth Disclosure of Present Disclosure: Improvement of DNN Based Congestion Control As one of NAS level congestion controls, a DNN based congestion control is used.

The DNN based congestion control is used to avoid and handle NAS signaling congestion of UE using specific DNN regardless of Single Network Slice Selection Assistance Information (S-NSSAI). Both the UE and the 5GC support functions for providing the DNN based congestion control.

The SMF rejects PDU session establishment/modification request messages transmitted from the UE together the back-off timer and DNN associated with the back-off timer to apply the DNN based congestion control for the UE. The SMF transmits, to the UE, a PDU session release request message together with the back-off timer to release a PDU session which belongs to the congested DNN. When the back-off timer is set in the PDU session release request message, a cause value "reactivation requested" should not be set.

When the DNN based congestion control is activated in the AMF, the AMF may provide an NAS transport error message for an NAS transport message for transporting a session management (SM) message. The NAS transport error message may include DNN associated with the back-off timer. While a back-off timer for specific DNN is running, the UE does not transmit any NAS message for the specific DNN.

Upon receiving the back-off timer for the DNN, the UE should perform the following operations until the timer has expired.

When the DNN associated with the back-off timer is provided, the UE should not initiate any SM procedure for the congested DNN. The UE may initiate SM procedures for other DNNs. When the UE moves to the EPS, the UE should not initiate any SM procedure for an access point name (APN) corresponding to the DNN. However, in the following case, the SM procedure may be exceptionally initiated.

The UE is operating in the single registration mode for the interworking without the N26 interface and when the UE moves to the EPS, the UE transmits the PDN connectivity request message to initiate the PDN connection procedure. In this case, when the MME is set to enable the interworking without the N26 interface between the 5GS and the EPS and the request type of the received PDN connectivity request message is set to "handover", the MME may accept and process the PDN connectivity request message without applying the APN based SM congestion control.

When the DNN associated with the back-off timer is not provided, the UE does not initiate SM requests of a random PDU session type without the DNN. The UE may initiate session management procedures for specific DNN.

A Cell/TA/PLMN/.RAT change, change of a non-trusted non-3GPP access network, or a change of an access type does not stop the back-off timer.

While the back-off timer is running, the UE may initiate SM procedures for emergency services and the access having the high priority.

When the UE receives the SM request message initiated by the network for the congested DNN while the back-off timer is running, the UE should stop the SM back-off timer associated with the DNN and respond to the 5GC.

The UE may initiate the PDU session release procedure (i.e., transmitting the PDU session release request message) while the back-off timer is running. In this case, the UE does not delete the associated back-off timer when disconnecting the PDU session.

The UE should support a separate back-off timer for all DNNs which may be used by the UE.

In order to a large number of UEs to avoid requests delayed due to the back-off timer from being (almost) simultaneously initiated, the 5GC should select a back-off timer value so as to prevent the delayed requests from being synchronized.

The DNN based SM congestion control may be applied to NAS SM signaling of a control plane initiated from the UE. The SM congestion control does not prevent initiating data transmission/reception or the service request procedure of the UE for activating a user plane connection for DNN which is a target of the SM congestion control.

Contents described up to now may be implemented by hardware. This will be described with reference to a drawing.

Figure 13:
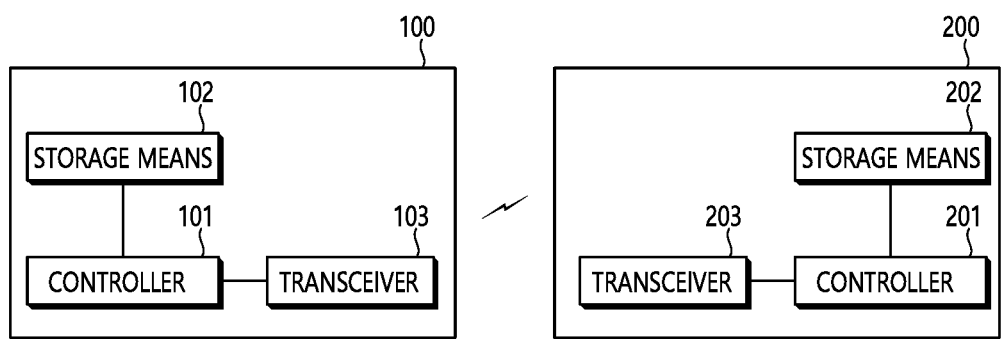
FIG. 13 is a configuration block diagram of UE and a network node according to an embodiment of the present disclosure.

FIG. 13 is a configuration block diagram of a UE and a network node according to an embodiment of the present disclosure.

As shown in FIG. 13, the UE 100 includes a storage means 101, a controller 102, and a transceiver 103. In addition, the network node may be any one of AMF, SMF, NEF, and AF. The network node includes a storage means 511, a controller 512, and a transceiver 513.

The storage means store the aforementioned method.

The controllers control the storage means and the transceivers. Specifically, the controllers execute the methods stored in the storage means, respectively. In addition, the controller transmits the aforementioned signals through the transceivers.

Although preferred embodiments of the present disclosure has been exemplarily described as above, the scope of the present disclosure is limited to only the specific embodiments, and as a result, various modifications, changes, or enhancements of the present disclosure can be made within the spirit of the present disclosure and the scope disclosed in the appended claims.

What is claimed is:

1. A method for performing an attach request procedure, the method performed by a user equipment (UE) and comprising:

transmitting an attach request message to a second system when an intersystem change from a first system to the second system is required in a state where a back-off timer associated with a data network name (DNN) based congestion control is running, wherein the attach request message includes information on a packet data unit (PDU) session used by the UE in the first system, and the information on the PDU session is used so as not for the attach request message to be rejected by a second network, even if the back-off timer associated with the DNN-based congestion control is running.

2. The method of claim 1, further comprising:

overriding the back-off timer which is running when the intersystem change from the first system to the second system is required.

3. The method of claim 1, wherein the information on the PDU session includes identification information for one or more PDU sessions used in the first system.

4. The method of claim 1, wherein the information on the PDU session is included in an information element field in the attach request message.

5. The method of claim 1, wherein the information on the PDU session is included in a protocol configuration option (PCO) in a session management (SM) container in the attach request message.

6. The method of claim 1, wherein the first network is a $5^{th}$ generation system (5GS) and the second network is an evolved packet system (EPS).

7. A method for performing an attach request procedure, the method performed by a mobility management entity (MME) and comprising:
receiving an attach request message from user equipment (UE) which requires an intersystem change from a first system to a second system in a state where a back-off timer associated with a data network name (DNN) based congestion control is running;
overriding the back-off timer which is running when the attach request message includes information on a packet data unit (PDU) session which the UE uses in the first system; and
transmitting, to the UE, an accept message for the attach request message.

8. The method of claim 7, further comprising:
performing a procedure for packet data network (PDN) connection creation for the corresponding PDU session based on the information on the PDU session.

9. The method of claim 7, wherein the information on the PDU session includes identification information for one or more PDU sessions used in the first system.

10. The method of claim 7, wherein the information on the PDU session is included in an information element field in the attach request message.

11. The method of claim 7, wherein the information on the PDU session is included in a protocol configuration option (PCO) in a session management (SM) container in the attach request message.

12. The method of claim 7, wherein the first network is a 5th generation system (5GS) and the second network is an evolved packet system (EPS).

13. A user equipment (UE) for performing an attach request procedure, the UE comprising:
a transceiver; and
a processor including the transceiver,
wherein the processor performs
a process of transmitting an attach request message to a second system when an intersystem change from a first system to the second system is required in a state where a back-off timer associated with a data network name (DNN) based congestion control is running,
wherein the attach request message includes information on a packet data unit (PDU) session used by the UE in the first system, and
wherein the information on the PDU session is used so as not for the attach request message to be rejected by a second network, even if the back-off timer associated with the DNN-based congestion control is running.

14. A mobility management entity (MME) for performing an attach request procedure, the MME comprising:
a transceiver; and
a processor controlling the transceiver,
wherein the processor performs
receiving an attach request message from user equipment (UE) which requires an intersystem change from a first system to a second system in a state where a back-off timer associated with a data network name (DNN) based congestion control is running,
overriding the back-off timer which is running when the attach request message includes information on a packet data unit (PDU) session which the UE uses in the first system, and
transmitting, to the UE, an accept message for the attach request message.

* * * * *